US012330046B2

(12) United States Patent
Shigeta

(10) Patent No.: US 12,330,046 B2
(45) **Date of Patent: *Jun. 17, 2025**

(54) MANAGEMENT SYSTEM OF GAMING CHIPS AND STORAGE BOX

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

(*) Notice: Subject to any disclaimer, the term of this patent is extended or adjusted under 35 U.S.C. 154(b) by 723 days.

This patent is subject to a terminal disclaimer.

(21) Appl. No.: 17/335,386

(22) Filed: Jun. 1, 2021

(65) Prior Publication Data

US 2021/0283493 A1 Sep. 16, 2021

Related U.S. Application Data

(63) Continuation of application No. 16/662,581, filed on Oct. 24, 2019, now Pat. No. 11,052,304, which is a
(Continued)

(30) Foreign Application Priority Data

Dec. 30, 2016 (JP) ................................ 2016-258007

(51) Int. Cl.
*A63F 1/06* (2006.01)
*A63F 1/00* (2006.01)
(Continued)

(52) U.S. Cl.
CPC .......... *A63F 1/062* (2013.01); *A63F 11/0002* (2013.01); *G07F 17/3216* (2013.01);
(Continued)

(58) Field of Classification Search
CPC ............... G07F 17/322; G07F 17/3241; G07F 17/3225; A63F 2011/0006
See application file for complete search history.

(56) References Cited

U.S. PATENT DOCUMENTS

| | | | |
|---|---|---|---|
| 5,651,548 A | 7/1997 | French et al. | |
| 5,735,742 A | 4/1998 | French | |

(Continued)

FOREIGN PATENT DOCUMENTS

| | | | |
|---|---|---|---|
| AU | 2005205742 | A1 | 2/2007 |
| AU | 2014210600 | B2 | 2/2015 |

(Continued)

OTHER PUBLICATIONS

US Office Action issued for U.S. Appl. No. 16/474,856 on Oct. 28, 2022.

(Continued)

*Primary Examiner* — Michael D Dennis
(74) *Attorney, Agent, or Firm* — NORTON ROSE FULBRIGHT US LLP

(57) ABSTRACT

A system that manages a package of shuffled playing cards and gaming chips includes a storage box and a control apparatus. The storage box is provided in association with a game table and stores a plurality of shuffled playing cards and a plurality of chip cases and also includes a card reader that reads playing card ID codes of the shuffled playing cards and a chip reader that reads case ID codes of the chip cases. The control apparatus outputs total numbers of the shuffled playing cards and the chip cases stored in the storage box and the playing card ID codes and case ID codes stored in the storage box by monitoring read playing card ID codes and case ID codes.

18 Claims, 15 Drawing Sheets

Related U.S. Application Data continuation of application No. 15/854,448, filed on Dec. 26, 2017, now Pat. No. 10,493,357.

(51) Int. Cl.

| | |
|---|---|
| ***A63F 3/00*** | (2006.01) |
| ***A63F 9/24*** | (2006.01) |
| ***A63F 11/00*** | (2006.01) |
| ***G07F 17/32*** | (2006.01) |

(52) U.S. Cl.

CPC ........ *G07F 17/322* (2013.01); *G07F 17/3241* (2013.01); *G07F 17/3293* (2013.01); *A63F 2001/001* (2013.01); *A63F 1/06* (2013.01); *A63F 1/067* (2013.01); *A63F 3/00157* (2013.01); *A63F 2003/00164* (2013.01); *A63F 2009/2425* (2013.01); *A63F 2009/2439* (2013.01); *A63F 11/00* (2013.01); *A63F 2011/0006* (2013.01); *A63F 2250/58* (2013.01)

(56) References Cited

U.S. PATENT DOCUMENTS

| | | | | |
|---|---|---|---|---|
| 5,831,527 | A | 11/1998 | Jones, II et al. | |
| 5,957,776 | A | 9/1999 | Hoehne | |
| 7,258,612 | B2 * | 8/2007 | Fujimoto | G07F 17/32 463/25 |
| 7,846,020 | B2 * | 12/2010 | Walker | G07F 17/32 463/29 |
| 8,088,010 | B1 | 1/2012 | Hill | |
| 8,235,825 | B2 | 8/2012 | French | |
| 8,668,148 | B2 | 3/2014 | Gronau et al. | |
| 8,915,782 | B2 | 12/2014 | Fujimoto | |
| 9,242,436 | B1 | 1/2016 | Hallman et al. | |
| 9,858,756 | B2 | 1/2018 | Gelinotte et al. | |
| 10,493,357 | B2 | 12/2019 | Shigeta | |
| 10,675,530 | B2 | 6/2020 | Shigeta | |
| 11,126,908 | B2 | 9/2021 | Kotab | |
| 2003/0102970 | A1 * | 6/2003 | Creel | G06K 17/00 340/568.1 |
| 2004/0137977 | A1 | 7/2004 | Fujimoto | |
| 2004/0207156 | A1 | 10/2004 | Soltys et al. | |
| 2005/0054408 | A1 | 3/2005 | Steil et al. | |
| 2006/0205484 | A1 | 9/2006 | Nicastro | |
| 2007/0023500 | A1 | 2/2007 | De Raedt et al. | |
| 2007/0024449 | A1 | 2/2007 | Bilyeu et al. | |
| 2007/0026949 | A1 | 2/2007 | Charlier et al. | |
| 2007/0052167 | A1 | 3/2007 | Galatan | |
| 2007/0060311 | A1 | 3/2007 | Rowe et al. | |
| 2007/0225055 | A1 | 9/2007 | Weisman | |
| 2008/0180250 | A1 | 7/2008 | Steil | |
| 2008/0224400 | A1 | 9/2008 | Gnat | |
| 2009/0048026 | A1 | 2/2009 | French | |
| 2010/0093428 | A1 | 4/2010 | Mattice et al. | |
| 2010/0093429 | A1 | 4/2010 | Mattice et al. | |
| 2010/0304841 | A1 | 12/2010 | Sammon et al. | |
| 2011/0300917 | A1 | 12/2011 | Hill | |
| 2012/0050130 | A1 | 3/2012 | Nishioka et al. | |
| 2012/0080845 | A1 | 4/2012 | Emori et al. | |
| 2012/0100901 | A1 | 4/2012 | Kirsch | |
| 2012/0105215 | A1 | 5/2012 | Gronau et al. | |
| 2012/0241344 | A1 | 9/2012 | Gronau et al. | |
| 2013/0196777 | A1 | 8/2013 | Hill | |
| 2013/0207345 | A1 | 8/2013 | Gelinotte et al. | |
| 2013/0316797 | A1 * | 11/2013 | Gelinotte | G07F 17/3244 463/25 |
| 2014/0033660 | A1 | 2/2014 | Shigeta | |
| 2014/0274344 | A1 | 9/2014 | Kelly et al. | |
| 2014/0291399 | A1 | 10/2014 | Koyama | |
| 2014/0339107 | A1 | 11/2014 | Gelinotte et al. | |
| 2015/0042042 | A1 | 2/2015 | Shigeta | |
| 2015/0087371 | A1 | 3/2015 | Hill | |
| 2015/0375096 | A1 * | 12/2015 | Jackson | G07F 17/32 463/11 |
| 2016/0180633 | A1 | 6/2016 | Yamaguchi et al. | |
| 2016/0284160 | A1 | 9/2016 | Oh | |
| 2017/0018138 | A1 | 1/2017 | Mcburnie | |
| 2017/0032240 | A1 | 2/2017 | Kotab | |
| 2017/0106270 | A1 | 4/2017 | Shigeta | |
| 2018/0075690 | A1 | 3/2018 | Moore et al. | |
| 2018/0185741 | A1 | 7/2018 | Shigeta | |
| 2018/0189921 | A1 | 7/2018 | Feng et al. | |
| 2018/0190064 | A1 | 7/2018 | Feng et al. | |
| 2018/0253937 | A1 | 9/2018 | Curelea | |
| 2020/0122018 | A1 | 4/2020 | Shigeta | |
| 2023/0245526 | A1 | 8/2023 | Shigeta | |
| 2023/0338820 | A1 | 10/2023 | Shigeta | |

FOREIGN PATENT DOCUMENTS

| | | | |
|---|---|---|---|
| CN | 1508744 | A | 6/2004 |
| CN | 102441273 | A | 5/2012 |
| CN | 104368144 | A | 2/2015 |
| EP | 2545967 | A2 | 1/2013 |
| JP | 2002-181672 | A | 6/2002 |
| JP | 2005-342175 | A | 12/2005 |
| JP | 2007222529 | A | 9/2007 |
| JP | 2008013332 | A | 1/2008 |
| JP | 2009086984 | A | 4/2009 |
| JP | 4647247 | B2 | 3/2011 |
| JP | 2012-075781 | A | 4/2012 |
| JP | 2012075181 | A | 4/2012 |
| JP | 2012200309 | A | 10/2012 |
| JP | 2013-544005 | A | 12/2013 |
| JP | 2014504164 | A | 2/2014 |
| JP | 2014-203139 | A | 10/2014 |
| JP | 2015-037550 | A | 2/2015 |
| JP | 2015139611 | A | 8/2015 |
| JP | 2015525391 | A | 9/2015 |
| JP | 2016116544 | A | 6/2016 |
| JP | 2023112690 | A | 8/2023 |
| KR | 1020070009132 | A | 3/2014 |
| KR | 101468139 | B1 | 12/2014 |
| WO | 2003082420 | A1 | 10/2003 |
| WO | 2012161422 | A1 | 11/2012 |
| WO | 2015145499 | A1 | 10/2015 |
| WO | 2016014936 | A2 | 1/2016 |
| WO | 2016187164 | A1 | 11/2016 |
| WO | 2018123929 | A1 | 7/2018 |

OTHER PUBLICATIONS

Chinese Office Action issued for CN 201780086822.8 on Jun. 10, 2023.

Report on Advances in Electronics and Information Technology 2008-2009 by China Association for Science and Technology, p. 124-126, published on Mar. 31, 2009.

Japanese Office Action issued for JP2022-156703 on Jul. 4, 2023.

EP application No. 17210637.9, Summons to Oral Proceedings issued on Jul. 2, 2021.

JP application No. 2018-558809, 3rd Office Action issued on Jul. 13, 2021.

Chinese Office Action issued for CN 201780087769.3 on Jan. 28, 2023.

U.S. Appl. No. 16/474,856, Office Action issued on Aug. 27, 2021.

Macao application No. I/001542, 1st Office Action issued on Jul. 9, 2019.

New Zealand application No. 738780, Further Examination Report issued on Apr. 1, 2019.

Korean application No. 10-2017-0178552, Office Action issued on Dec. 11, 2018.

PCT application No. PCT/JP2017/032553, International Search Report issued on Nov. 7, 2017.

Filipino application No. 1/2018/000001, Formality Examination Report issued on Aug. 1, 2018.

European application No. 17210637.9, European Search Report dated May 7, 2018.

International Application No. PCT/JP2017/046347, International Search Report mailed Mar. 27, 2018.

(56) References Cited

OTHER PUBLICATIONS

Jieun Yu and Wonjun Lee, "Gentle: Reducing Reader Collision in Mobile RFID Networks", The 4th International Conference on Mobile Ad-hoc and Sensor Networks, MNS 2008, ISBN: 978-0-7695-3457-2, No. XP 031376554, pp. 280-287, Dec. 10, 2008, IEEE Computer Society, Piscataway, NJ, USA.
Australian application No. 2017389188, Examination Report No. 1 issued on May 5, 2020.
European application No. 17888889.7, Search Report issued on May 26, 2020.
European application No. 17887313.9, Search Report issued on May 26, 2020.
Japanese application No. 2018-558809, Office Action issued on Jun. 2, 2020.
KR application No. 10-2019-0108866, Office Action issued on Dec. 16, 2020.
U.S. Appl. No. 16/474,809, Office Action issued on Jun. 22, 2020.
U.S. Appl. No. 16/474,856, Office Action issued on Jun. 22, 2020.
CN application No. 201711423383.3, Office Action issued on Oct. 15, 2020.
CA application No. 2989878, Office Action issued on Jan. 27, 2021.
U.S. Appl. No. 16/474,856, Office Action issued on Feb. 23, 2021.
U.S. Appl. No. 16/474,809, Office Action issued on Apr. 23, 2021.
Chinese Office Action issued for CN201780086822.8 on Sep. 14, 2022.
US Office Action issued for U.S. Appl. No. 16/474,856 on Apr. 18, 2022.
Korean Office Action issued for KR10-2022-0062341 on Jul. 4, 2022.
JP Office Action issued for JP2018-559435 on Dec. 14, 2021.
New Zealand Patent Examination Report 1 dated Jan. 25, 2024 issued in NZ Application No. 754985.
U.S. Office Action dated Jan. 15, 2025 issued in U.S. Appl. No. 18/379,720.
Australian Examination Report dated Feb. 19, 2025 issued in AU Application No. 2023206173.
Japanese Office Action dated Mar. 18, 2025 issued in JP Application No. 2023-179750.
Korean Office Action dated Apr. 23, 2025 issued in KR Application No. 10-2024-0065322.

* cited by examiner

MANAGEMENT SYSTEM OF GAMING CHIPS AND STORAGE BOX

CROSS REFERENCE TO RELATED APPLICATION

This application is a continuation of U.S. patent application Ser. No. 16/662,581 filed Oct. 24, 2019, which is a continuation of U.S. patent application Ser. No. 15/854,448 filed Dec. 26, 2017 (now U.S. Pat. No. 10,493,357), which claims the benefit of JP Pat. App. No. 2016-258007 filed Dec. 30, 2016; the entire contents of each disclosure are incorporated herein by reference.

FIELD

The present invention relates to a system that manages playing cards and gaming chips and a storage box that stores playing cards and gaming chips.

BACKGROUND AND SUMMARY

Among many table games carried out in casinos and game facilities, baccarat and blackjack are known. In these games, a standard deck composed of 52 playing cards is used and normally distributed from a chute including a plurality of shuffled decks (six to nine or 10 decks) before a game is started. Also in casinos and game facilities, a large number of gaming chips to be used in these games are used.

Gaming chips are put into a chip tray on a game table and after each game ends, the casino side collects and stores won chips (loser's chips) in the chip tray and also pays out the gaming chips to the winner from the chip tray as a settlement of bets.

When gaming chips of the chip tray run short, lacking chips are directly transported from a cage (cashier) of the casino to the chip tray, which is filled therewith. When gaming chips are transported from the cage to the chip tray, gaming chips are housed in a dedicated case (for example, a case capable of housing 100 chips) for transportation. Conversely, when gaming chips in the chip tray become excessive, excessive chips are directly transported to the cage of the casino after being housed in the dedicated case.

To measure gaming chips inside a casino, a conventional technology that measures the quantity and the amount of money of gaming chips for monitoring by embedding RFID in a gaming chip and reading RFID is known. A technology that manages gaming chips on the game table, gaming chips stored in the chip tray, and gaming chips of the cage by using an RFID attached chip is publicly known and disclosed in Patent Document 1 (U.S. Pat. No. 5,735,742).

It is difficult to prevent fraud and losses only by managing gaming chips in a portion of casinos such as the table, the chip tray, or the cage. Particularly when gaming chips are moved between the chip tray and the cage, it is difficult to prevent theft and losses of gaming chips and so continuous monitoring of gaming chips inside casinos is demanded.

A system according to an aspect of the present invention is a system that manages a package of shuffled playing cards and gaming chips, wherein the system includes the shuffled playing cards having playing cards constituting a predetermined number of decks shuffled in random order and integrally constituted individually as one container or package with a unique playing card ID code provided to the container or package, a chip case housing gaming chips having a chip ID code and to which a case ID code is provided, a game table on which a game is played using the shuffled playing cards and the gaming chips, a storage box provided in association with the game table to store a plurality of the shuffled playing cards carried from a card room and inserted into a card shooter apparatus on the game table and also to store a plurality of the chip cases housing the gaming chips used on the game table and including an opening/closing mechanism enabling taking out of the shuffled playing cards and the chip cases, and a control apparatus to manage the shuffled playing cards and the gaming chips, the storage box includes one or a plurality of card readers that reads playing card ID codes of all stored shuffled playing cards and also one or a plurality of chip readers that reads case ID codes of all stored chip cases, and the control apparatus has a function to output total numbers of the shuffled playing cards and the chip cases and also all the playing card ID codes and the case ID codes stored in the storage box by monitoring the playing card ID codes read by the card reader and the case ID codes read by the chip reader.

In the above system, the storage box may include a lock unit configured to prevent the shuffled playing cards and the chip cases of the gaming chips from being taken out from the storage box.

In the above system, the storage box may have a shuffled playing card storage box that stores the shuffled playing cards and a chip storage box that houses the gaming chips by allowing the gaming chips to be taken in or out independently.

In the above system, the case ID code of the chip case may be associated with the chip ID code of the gaming chip in the case and the control apparatus may have a function to output a total amount of value of all the gaming chips housed in the storage box by acquiring all the case ID codes housed in the storage box.

In the above system, the control apparatus has a function to grasp an increase/decrease of the chip cases housed in the storage box by periodically monitoring the case ID code of the chip case and, when the increase/decrease is grasped, to output the total amount after the increase/decrease of the value of all the gaming chips housed in the storage box.

Another aspect of the present invention is a system that manages shuffled playing cards and gaming chips, including shuffled playing cards having playing cards constituting a predetermined number of decks shuffled in random order and integrally constituted individually as one container or package with a unique playing card ID code provided to the container or package, a chip case housing gaming chips having a chip ID code, a game table on which a game is played using the shuffled playing cards and the gaming chips, a shuffled playing card storage box provided in association with the game table to store a plurality of the shuffled playing cards carried from a card room and inserted into a card shooter apparatus on the game table, a chip storage box that stores a plurality of the chip cases housing the gaming chips used on the game table, and a control apparatus to manage the shuffled playing cards and the gaming chips, wherein the control apparatus has a function to output total numbers of the shuffled playing cards stored in the shuffled playing card storage box and the gaming chips stored in the chip storage box and also all playing card IDs stored in the shuffled playing card storage box and all case IDs stored in the chip storage box by monitoring the playing card IDs read by a card reader that reads the playing card ID codes of all the shuffled playing cards stored in the shuffled playing card storage box and the chip ID codes of all the gaming chips read by a chip reader that reads the chip ID codes of all the gaming chips stored in the chip storage box.

In the above system, the control apparatus may have a function to output a total amount of value of all the gaming chips housed in the chip storage box by reading all the chip ID codes present in the chip storage box.

In the above system, the case ID code of the chip case may be associated with the chip ID code of the gaming chip in the case and the control apparatus may have a function to output a total amount of value of all the gaming chips housed in the chip storage box by acquiring all the case ID codes housed in the chip storage box.

In the above system, the control apparatus has a function to grasp an increase/decrease of the gaming chips housed in the chip storage box by periodically monitoring the chip ID code of the gaming chip stored in the chip storage box and, when the increase/decrease is grasped, to output the total amount after the increase/decrease of the value of all the gaming chips housed in the chip storage box.

In the above system, the shuffled playing card storage box may include a lock unit configured to prevent taking out of the shuffled playing cards from the shuffled playing card storage box.

Still another aspect of the present invention is a storage box that manages shuffled playing cards and gaming chips, wherein the storage box is carried from a card room to store a plurality of shuffled playing cards and also makes available the shuffled playing cards by individually taking out and inserting the shuffled playing cards into a card shooter apparatus on a game table and further stores a plurality of chip cases housing gaming chips used on the game table to adjust a quantity of the gaming chips on the game table using the chip cases when the gaming chips on the game table are excessive or lacking in accordance with development of a game on the game table and also to be able to store the gaming chips that are excessive before being transferred to a cage that manages the gaming chips of a casino and includes an opening/closing mechanism arranged near the game table to enable taking out of the shuffled playing cards and gaming chips when necessary, the shuffled playing cards have playing cards constituting a predetermined number of decks shuffled in random order and are integrally constituted individually as one container or package with a unique playing card ID code provided to the container or package, the gaming chip has a chip ID code and is housed in the chip case to which a case ID code is provided, the storage box includes one or a plurality of card readers that reads the playing card ID code of all the shuffled playing card stored and also one or a plurality of chip readers that reads the case ID code of all the chip cases stored or the chip ID code of the gaming chips in the chip cases, and a control apparatus has a function to output total numbers of the shuffled playing cards and the chip cases stored in the storage box and also all the playing card ID codes and the case ID codes or chip ID codes stored in the storage box by monitoring the playing card ID codes read by the card reader and the case ID codes or chip ID codes read by the chip reader.

The storage box may include a lock unit configured to prevent taking out of the shuffled playing cards or the gaming chips from the storage box.

The storage box may include a shuffled playing card storage box that stores the shuffled playing cards and a chip storage box that houses the gaming chips by allowing the gaming chips to be taken in or out independently.

In the above storage box, the control apparatus may have a function to output a total amount of value of all the gaming chips housed in the storage box by reading all the chip ID codes present in the storage box.

In the above storage box, the case ID code of the chip case may be associated with the chip ID code of the gaming chip in the case and the control apparatus may have a function to output a total amount of value of all the gaming chips housed in the storage box based on the case ID code by acquiring all the case ID codes housed in the storage box.

Still another aspect of the present invention is a system including a chip case that houses gaming chips having a chip ID code, a storage box that stores a plurality of the chip cases housing the gaming chips used on a game table, adjusts a quantity of the gaming chips on a chip float of the game table using the chip cases when the gaming chips placed on the chip float of the game table are excessive or lacking in accordance with development of a game on the game table and also is able to store the gaming chips that are excessive before being transferred to a cage that manages the gaming chips of a casino and includes an opening/closing mechanism to enable taking out of the gaming chips when necessary, the game table on which a game is played using the gaming chips, and a control apparatus to manage the gaming chips, wherein the storage box includes one or a plurality of chip readers that reads chip ID codes of all stored gaming chips, and the control apparatus has a function to output a total number of the gaming chips stored in the storage box and all the chip ID codes stored in the storage box by monitoring the chip ID code read by the chip reader.

In the above system, the control apparatus may have a function to output a total amount of value of all the gaming chips housed in the storage box by reading all the chip ID codes present in the storage box.

In the above system, the storage box may include a lock unit configured to prevent taking out of the chip cases of gaming chips from the storage box.

In the above system, the control apparatus has a function to grasp an increase/decrease of the gaming chips housed in the storage box by periodically monitoring the chip ID code of the gaming chip stored in the storage box and, when the increase/decrease is grasped, to output the total amount after the increase/decrease of the value of all the gaming chips housed in the storage box.

In the above system, the control apparatus may have a function to output whether an increase/decrease amount or increase/decrease value of the gaming chips placed on the chip float of the game table or an increase/decrease amount or increase/decrease value of the gaming chips placed in the cage that manages the gaming chips of a casino and an increase/decrease amount or increase/decrease value of the gaming chips housed in the storage box match.

In the above system, a case ID code may be provided to the chip case and associated with the chip ID code of the gaming chip in the case.

Still another aspect of the present invention is a gaming chip used by a system that manages the gaming chips including a unique chip ID code, wherein the gaming chip is housed in a chip case, the chip case is housed in a storage box including an opening/closing mechanism together with shuffled playing cards, and the chip ID code is configured to be read by a chip reader installed in the storage box and managed by a control apparatus that outputs a total number of the gaming chips stored in the storage box and all chip ID codes stored in the storage box.

Still another aspect of the present invention is a gaming chip managed by the above system.

Still another aspect of the present invention is a chip case housing gaming chips used by a system that manages the gaming chips, wherein the gaming chip has a unique chip ID code, a chip case housing the gaming chip has a shape in which columns housing the gaming chips by being stacked in an axial direction are formed in parallel and is housed in a storage box including an opening/closing mechanism together with shuffled playing cards, and the chip case is configured so that the chip ID codes of the gaming chips stacked in the axial direction by a chip reader installed in the storage box from outside the chip case in the axial direction of the gaming chips.

In the above chip case, the chip case housing the gaming chips may be constructed of an upper portion and a lower portion being joined, an upper surface of the upper portion may be formed as a flat surface, and an undersurface of the lower portion may have a shape in which columns housing the gaming chips by being stacked in the axial direction are formed in parallel.

In the above system, the playing card ID code and the case ID code may be identified by using a wireless tag.

In the above system, the playing card TD code may use a wireless tag of UHF and the case ID code may use a wireless tag of HF.

The foregoing and other objects, features, aspects and advantages of the exemplary embodiments will become more apparent from the following detailed description of the exemplary embodiments when taken in conjunction with the accompanying drawings.

DETAILED DESCRIPTION OF EMBODIMENTS

A first embodiment provides a system that monitors gaming chips of a casino in real time and the system can handle an error when the error occurs by managing all gaming chips in the casino. The first embodiment further provides a system of continuous monitoring that, in addition to management of gaming chips, prevents losses because if a shuffled playing card package is once lost in a casino, someone may know the alignment thereof and the package may not be used in a game.

Figure 1:
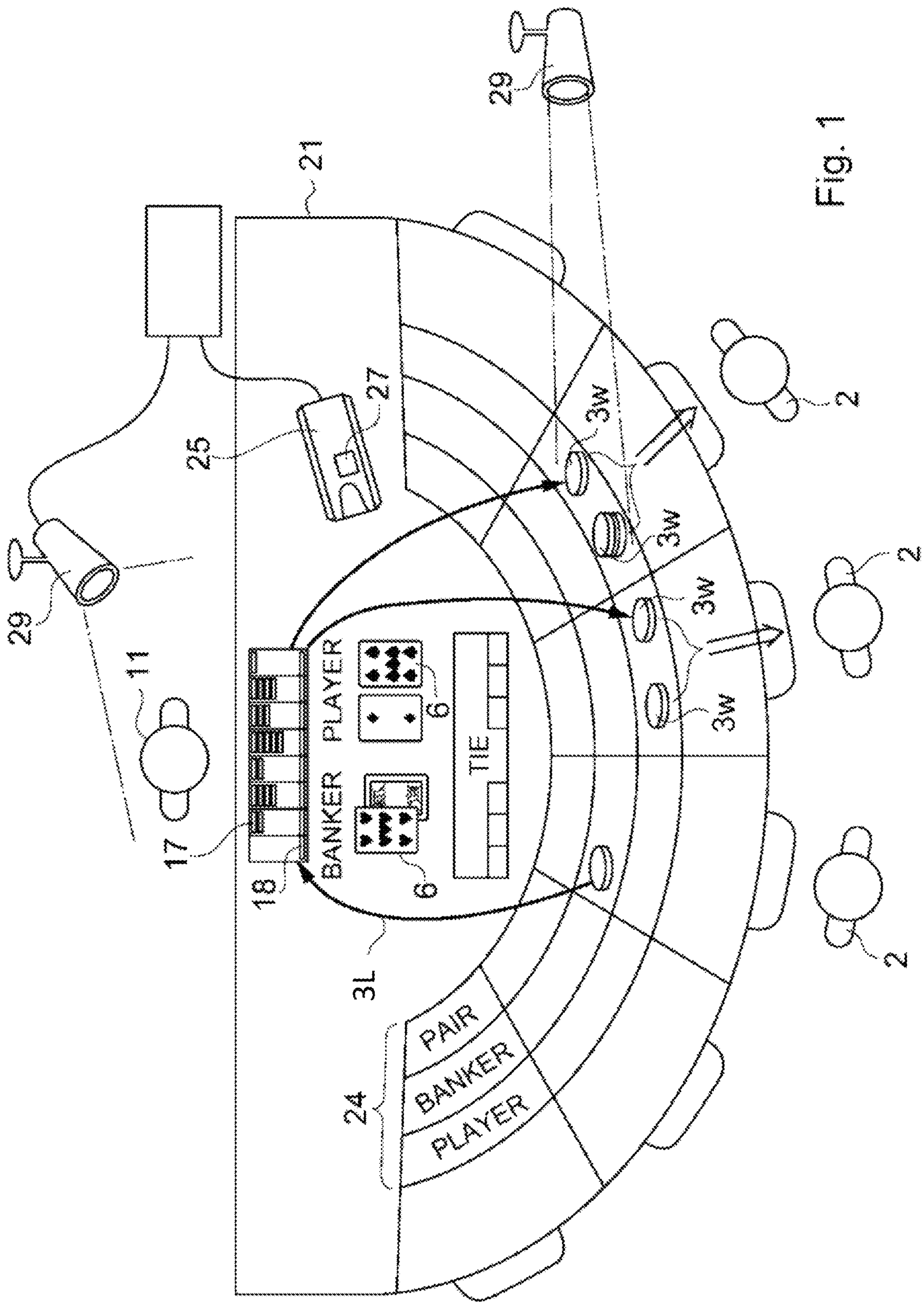
FIG. 1 is a schematic diagram providing an overview of a table game system according to a first embodiment of the present invention.

A system that manages gaming chips according to the first embodiment of the present invention will be described below. FIG. 1 is an explanatory diagram providing an overview of a table game of casino according to an embodiment of the present invention. In the present embodiment, a game table 21 includes a betting area 24 where a betting person 2 places a gaming chip 3 as a bet and a chip tray 17 capable of housing a plurality of gaming chips to collect a lost chip 3L and redeem a won chip 3W after each game ends. Also, a card shooter apparatus 25 placed on the game table 21, having a card reader that reads the number (rank) of a mark of the card 6, and having a controller 27 that determines the winner according to rules of a table game based on information of the number (rank) of the card 6 successively read by the card shooter apparatus 25 is installed.

An increase/decrease amount of the gaming chips 3 in the chip tray 17 before/after collection of the lost chip 3L and redemption of the won chip 3W can be calculated by comparing the total of the gaming chips 3 in the chip tray 17 before collection of the lost chip 3L and redemption of the won chip 3W and the total of the gaming chips 3 in the chip tray 17 after collection of the lost chip 3L and redemption of the won chip 3W. The total of the gaming chips 3 in the chip tray 17 before collection of the lost chip 3L and redemption of the won chip 3W and the total of the gaming chips 3 in the chip tray 17 after collection of the lost chip 3L and redemption of the won chip 3W can be detected by embedding RFID indicating its quantity in the gaming chip 3 and providing an RFID reader 18 in the chip tray 17.

Figure 2A:
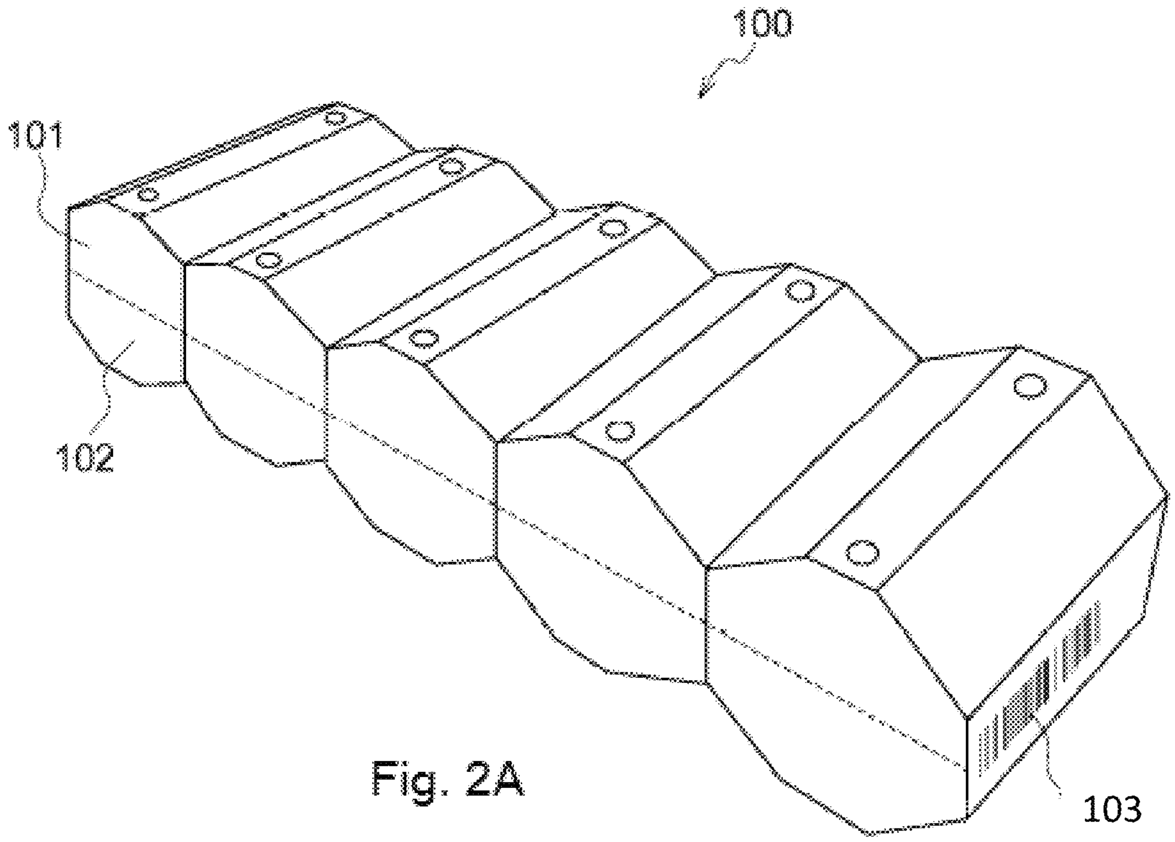
FIG. 2A is a perspective view showing a chip case according to an embodiment of the present invention.

FIG. 2A is a perspective view of a dedicated chip case 100 to house a plurality of gaming chips 3 used in casinos. The chip case 100 includes an upper portion 101 and a lower portion 102. In the present embodiment, the upper portion 101 and the lower portion 102 are made of transparent resin. Alight transmission portion that allows light to transmit may also be provided so as to be able to image housed gaming chips using a camera. Also in the present embodiment, the case 100 has a sealing structure made of the upper portion 101 and the lower portion 102, but the light transmission portion may be in a perforated state.

In the present embodiment, the case 100 has a shape in which five columns, in each of which 20 pieces of the gaming chip 3 are overlaid and housed, are formed in parallel and in the example of FIG. 2A, the cross section of each column is polygonal (octagonal) so that the upper portion 101 and the lower portion 102 roughly match the shape of a gaming chip C.

A unique chip case ID code 103 is attached to the chip case 100. The chip case ID code 103 is related to a chip ID code of the gaming chip 3 housed in the chip case.

Figure 2B:
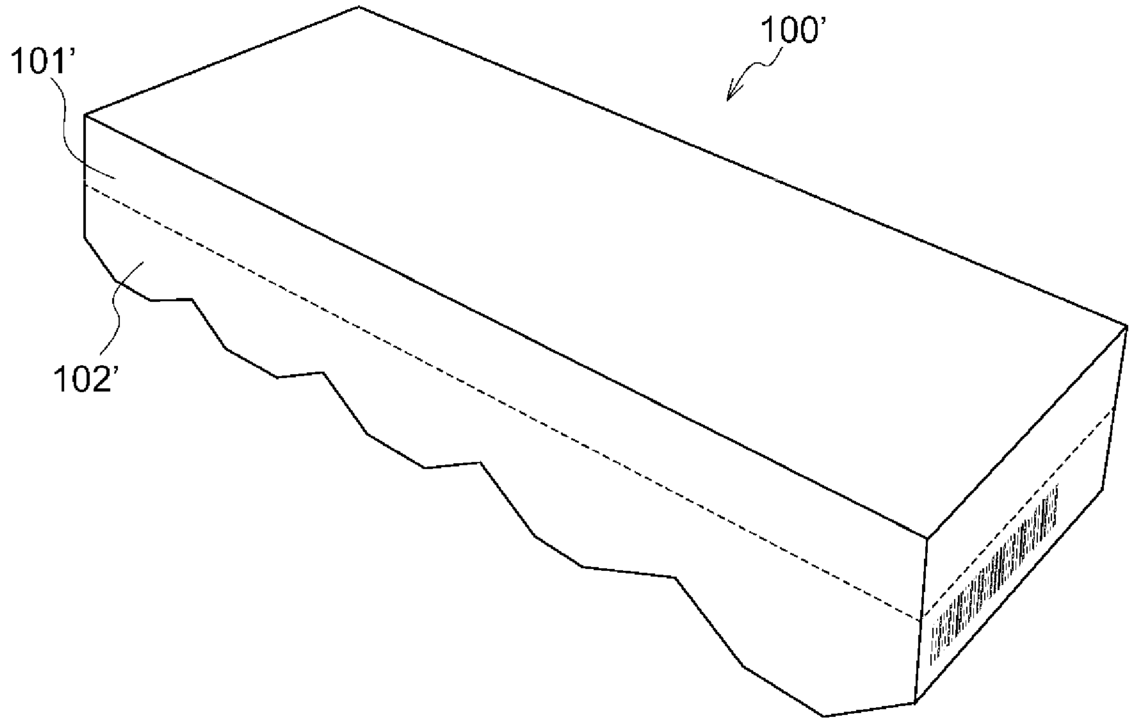
FIG. 2B is a perspective view showing a chip case according to a modification of the first embodiment of the present invention.

FIG. 2B is a perspective view of a case 100' according to a modification. The case 100' is also made of an upper portion 101' and the lower portion 102 constructed of transparent resin. In the present modification, the top surface is formed from a flat surface. By changing to the flat surface, a linear shadow due to edges of a polygonal cross section of the case 100' does not appear in the camera so that information of the side face of the gaming chip 3 can correctly be identified in image analysis of a shot image of the camera.

Figure 3:
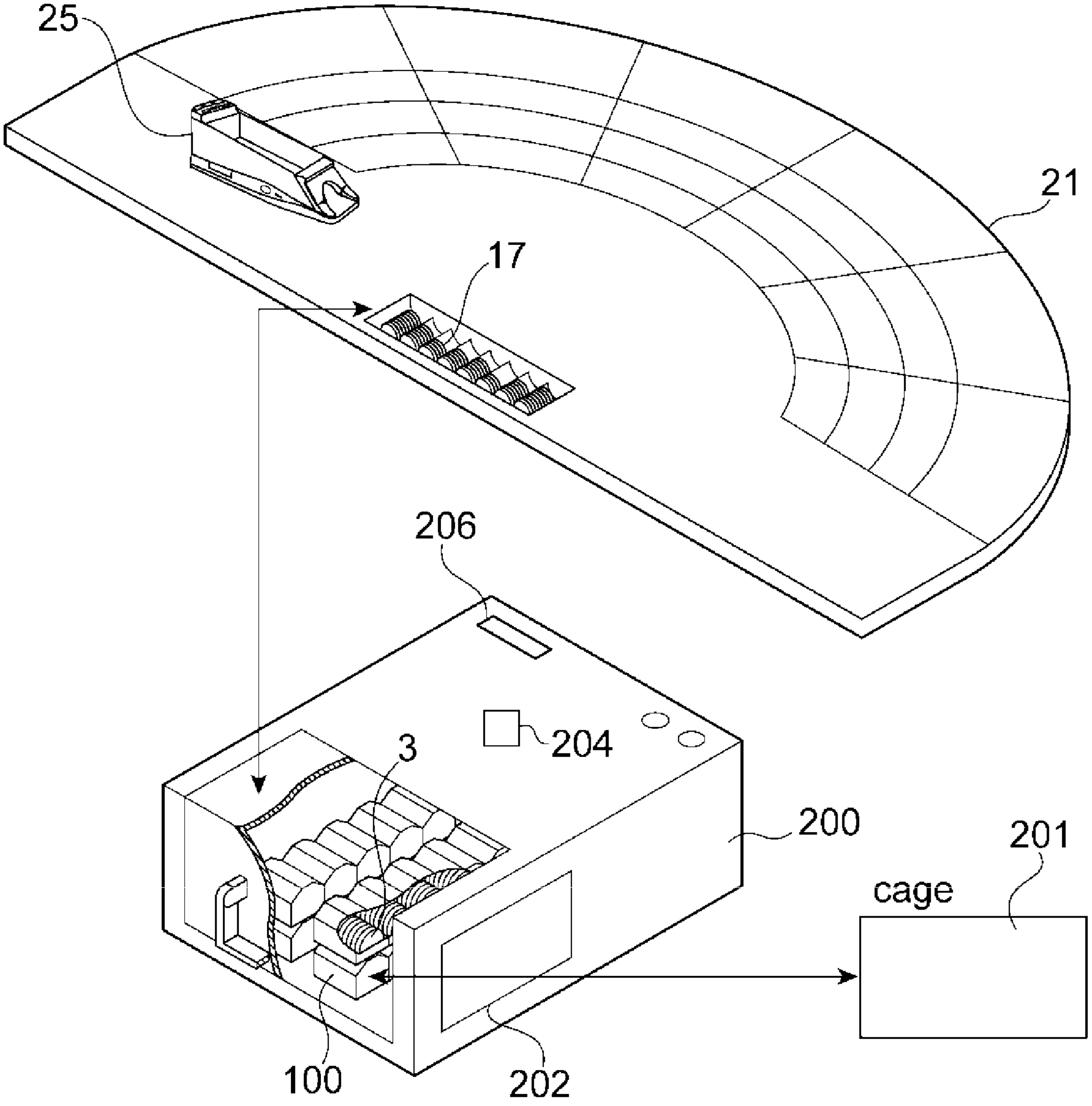
FIG. 3 is a diagram providing an overview of an overall system that manages the chip case housing gaming chips according to the first embodiment of the present invention.

FIG. 3 is an explanatory diagram providing an overview of a management system of gaming chips installed beside the game table 21 and using a storage box 200 storing a plurality of the chip cases 100 in which the gaming chips 3 are housed. The gaming chips 3 for replenishment are housed in the storage box 200 while being put into the chip case 100 and when the gaming chips 3 in the chip tray 17 run short, a dealer 11 takes out the chip case 100 together with the gaming chips 3 for replenishment from the storage box 200 to set the chip case 100 to the chip tray 17. When the gaming chips 3 in the chip tray 17 become excessive, the excessive gaming chips 3 can be put into the chip case 100 and housed in the storage box 200. Thus, the storage box 200 is placed by the dealer 11 beside the game table 21.

When the chip cases 100 stored in the storage box 200 and housing the gaming chips 3 run short, as many the chip cases 100 as necessary can be moved from a cage (cashier) 201 in a casino for replenishment. When the chip cases 100 stored in the storage box 200 become excessive, the chip cases 100 that are excessive are moved to the cage 201.

The chip case ID code 103 is attached to the chip case 100 and the chip case ID code 103 attached to the chip case 100 is continuously read by one or a plurality of readers for reading chip case ID 202 installed inside the storage box 200.

The storage box 200 also includes one or a plurality of chip readers that reads the chip ID code of all the gaming chips 3 stored.

A control apparatus 204 has a function to output the total number of the gaming chips 3 stored in the storage box and all the chip ID codes stored in the storage box by monitoring the chip ID code read by a chip reader (not shown).

The control apparatus 204 has a function to output whether an increase/decrease amount or increase/decrease value of the gaming chips 3 placed in the chip tray 17 of the game table 21 or an increase/decrease amount or increase/decrease value of the gaming chips 3 placed in the cage 201 that manages the gaming chips 3 of a casino and an increase/decrease amount or increase/decrease value of the gaming chips 3 housed in the storage box 200 match.

Whether the chip case 100 placed in the storage box 200 is inside the storage box 200 may be monitored by the control apparatus 204 at fixed intervals (for example, every one minute, every five minutes, every one hour or more). The storage box 200 may have the reader for reading chip case ID 202 to read the chip case ID code 103 of the chip case 100 arranged in a drawer 205 of the storage box 200. The reader for reading chip case ID 202 and the chip reader of the storage box 200 may be a bar code reader BR (alternatively, an RFID tag reader or QR code (registered trademark) reader (not shown) may be used instead of the bar code reader BR). The reader for reading chip case ID 202 and the chip reader may be installed so as to be able to scan in the X direction and Y direction to read all ID codes of the chip cases 100 by a scan unit 53 installed in the drawer 205. Also, a transmission unit 206 to transmit information obtained by the reader for reading chip case ID 202 and the chip reader to the outside of the storage box 200 is provided. The storage box 200 has a lock unit 207 to prevent the chip case 100 from being taken out from the storage box 200 by opening the drawer 205. The lock unit 207 is unlocked only while an authorized person of a casino puts in or takes out the chip case 100 from the storage box 200. Only an authorized person of a casino can operate the lock unit 207.

The storage box 200 includes the lock unit 207 to prevent the drawer 205 from opening and the lock unit 207 may include a warning unit (may be wireless) to notify that the drawer 205 has opened. When a notification that the drawer 205 has opened is received (or when appropriate), the storage box 200 may be imaged by a nearest monitoring camera 29 to record taking in or out of the chip case 100 from the storage box 200 by an authorized person or others. By recording such behavior (images in which the storage box 200 is opened), the fact that the chip case 100 can be taken in or out from the storage box 200 only while the lock unit 207 is unlocked by an authorized person (while the drawer 205 is opened) can be confirmed. By monitoring such images, the presence of all the chip cases 100 inside the storage box 200 can be confirmed.

The storage box 200 may have the plurality of readers 202 to read the chip case ID code 103 in an upper portion inside the storage box 200. The storage box 200 has the drawer 205 and the chip case 100 can be taken in or out by opening or closing the drawer 205. The storage box 200 includes the lock unit 207 to prevent illegal pilfering of the chip case 100. Further, as another idea, the storage box 200 may include as many the readers 202 as the maximum number of the chip cases 100 that can be stored in an upper portion inside the storage box 200.

Figure 4:
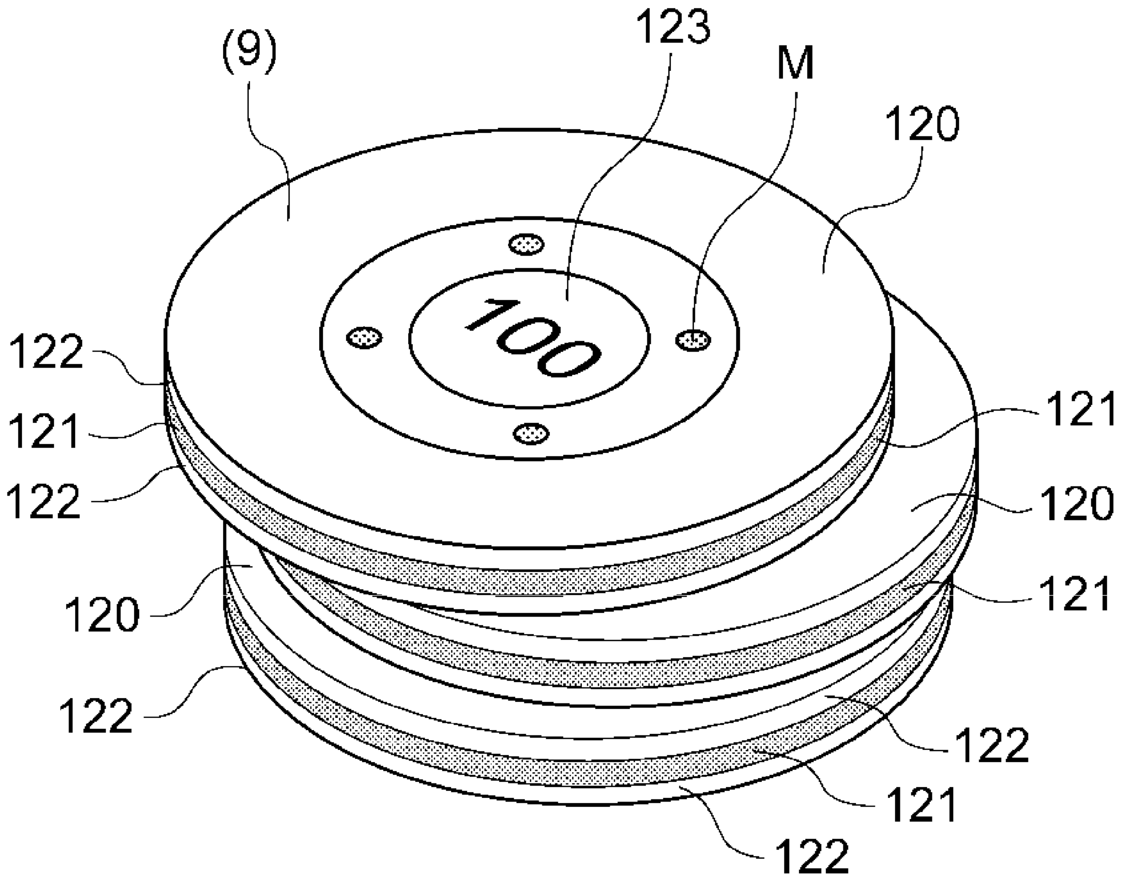
FIG. 4 is a perspective view showing the gaming chips according to the first embodiment of the present invention.
Figure 5:
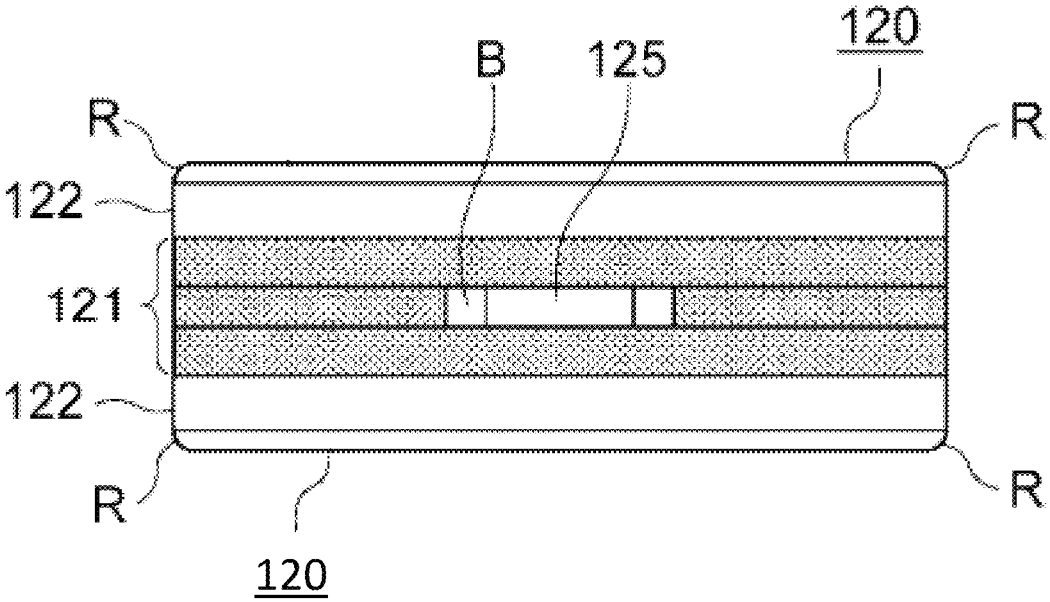
FIG. 5 is a front sectional view showing the gaming chip according to the first embodiment of the present invention.

Next, a gaming chip according to an embodiment of the present invention will be described. FIG. 4 is a perspective view of a state in which the gaming chips 3 are stacked and FIG. 5 is a sectional side elevation of the gaming chip 3. As shown in FIG. 4, the gaming chip 3 has at least a 5-layer structure in which a common color layer 122 has printing 123 (such as 100 points) indicating the kind (value) of the gaming chip 3 done on the surface (the upper surface and the undersurface), a transparent layer 120 is provided on the outermost layer, and layers are thermocompression-bonded. These gaming chips 3 are formed by using a plastic material in a long and narrow shape, forming a closely adhering condition (such as a 5-layer structure) in which each layer (a designated color layer 121, the common color layer 122, and the transparent layer 120) is thermocompression-bonded in a long state, and then stamping into a circular shape or rectangular shape by press or the like. An R finish (round angle) is given to edges of the transparent layer 120 in the outermost layer by designing dimensions of the die and punch of the mold to stamp when stamped by press.

Further, the gaming chip 3 is provided with a mark M in UV ink or carbon black ink on the surface of the common color layer 122. The mark M indicates genuineness of the gaming chip 3 and becomes visible when an ultraviolet ray (or an infrared ray) is applied thereto to indicate authenticity by its shape or a combination of numbers. The transparent layer 120 is thermocompression-bonded or coated as the outermost layer like covering the printing 123 and the mark M and the transparent layer 120 are embossed to prevent the gaming chips 3 from coming into close contact with each other.

An R finish (R) is given to edges of the transparent layer 120 in the outermost layer where the printing 123 (such as 100 points) is done to prevent the surface of the common color layer 122 from appearing on the side face after being discolored during the stamping process of gaming chip 3. Also, the R finish prevents hands and other gaming chips 3 from being damaged by otherwise remaining sharp edges of the gaming chip 3.

The designated color layer 121 may be formed from, as shown in FIG. 5, a plurality (three layers in FIG. 5) of layers colored in the designated color. The plurality (three layers in FIG. 5) of layers colored in the designated color is thermo-compression-bonded to each other and thus, the 3-layer structure is not visible as shown in FIG. 5 and FIG. 5 shows the three layers of the designated color layer 121 from a description viewpoint. Further, a hollow B is partially provided in the center layer of the three layers of the designated color layer 121 and an RFID tag 125 is contained therein.

As shown in FIGS. 4 and 5, the gaming chip 3 has a stacked multilayer structure and a striped pattern in a lamination direction is clearly formed on the side face so that, when compared with a conventional gaming chip, the color (the kind of gaming chip) of the designated color layer 121 and the number can be measured easily and correctly by the image analysis. The side face of the gaming chip 3 can be photographed by a camera so that the designated color layer 121 can clearly be identified. Further, if, in addition to the image analysis, an AI-utilizing computer or control system and deep learning (structure) technology are used, the analysis and determination of images can be made more correct. The AI-utilizing computer or control system and deep learning (structure) technology are already known and available to persons skilled in the art and so a detailed description thereof is omitted.

Next, an overview of a management system of gaming chips and shuffled playing cards using the storage box according to a second embodiment of the present invention will be described. In the second embodiment of the present invention, both of gaming chips and packages of shuffled playing cards are managed.

Figure 6:
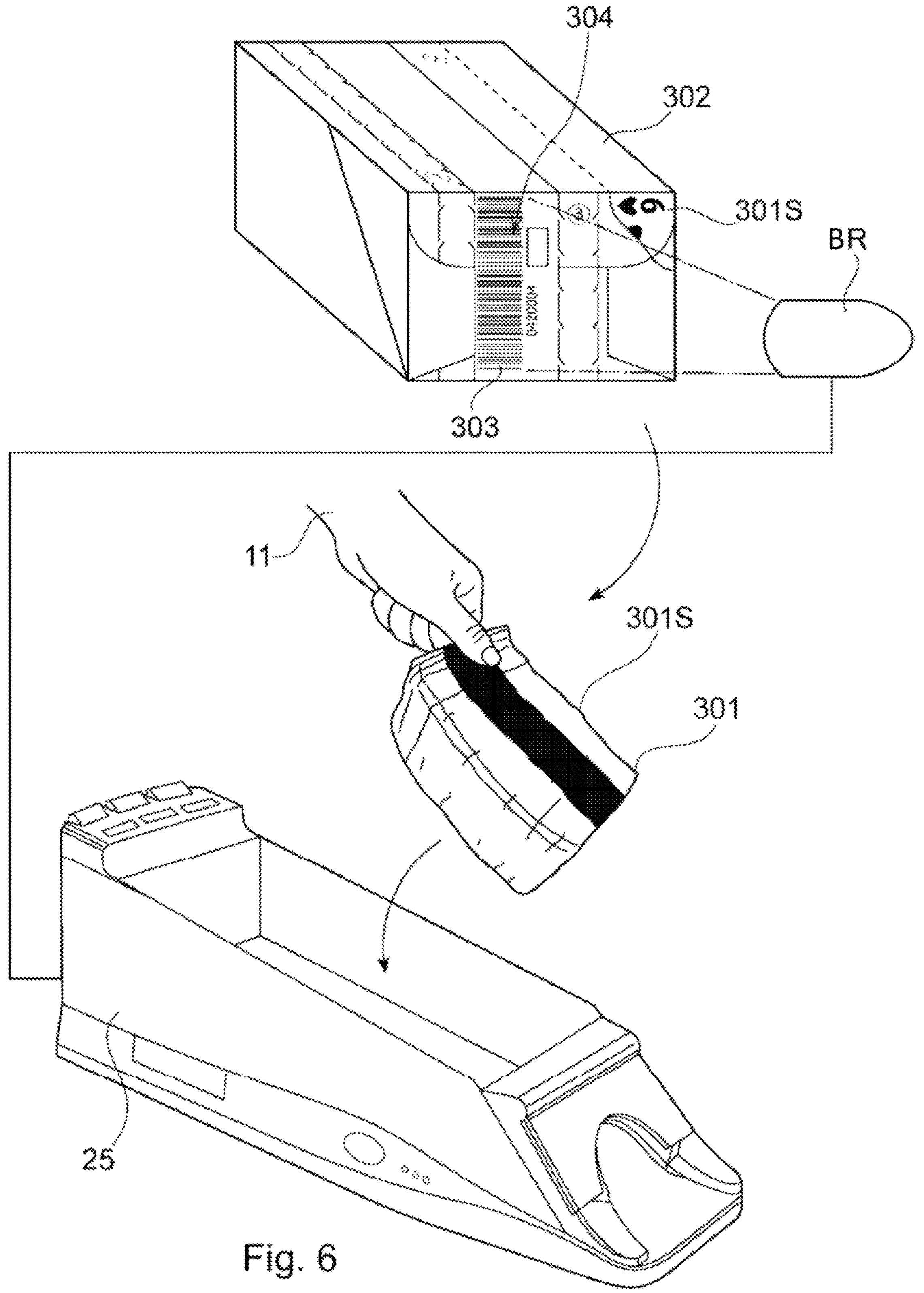
FIG. 6 is a perspective view of a package used for a card distribution chute of a management system according to the first embodiment of the present invention and unpacked shuffled playing cards.

FIG. 6 is an explanatory diagram providing an overview of a package of shuffled playing cards used in a table game of a casino and aligned randomly being used in the casino according to an embodiment of the present invention. In the present embodiment, shuffled playing cards 301S are packed as a package 302 and the package 302 is unpacked so that the shuffled playing cards 301S can be used for games on the table and set to the card shooter apparatus 25. During the game, the dealer 11 draws out cards 301 from the card shooter apparatus 25 and distributes the cards 301 to the game table 21. Cards of each shuffled playing card 301S with a predetermined number of decks (usually 6, 8, 9 or 10 decks) are produced so as to be randomly shuffled and uniquely randomly aligned individually and packed together with a package ID code 304 attached to the package 302 as a bar code 303 individually identifiable by the bar code reader BR. RFID (or an RF tag) may be attached to the ID code 304 instead of or together with the bar code 303.

Figure 7:
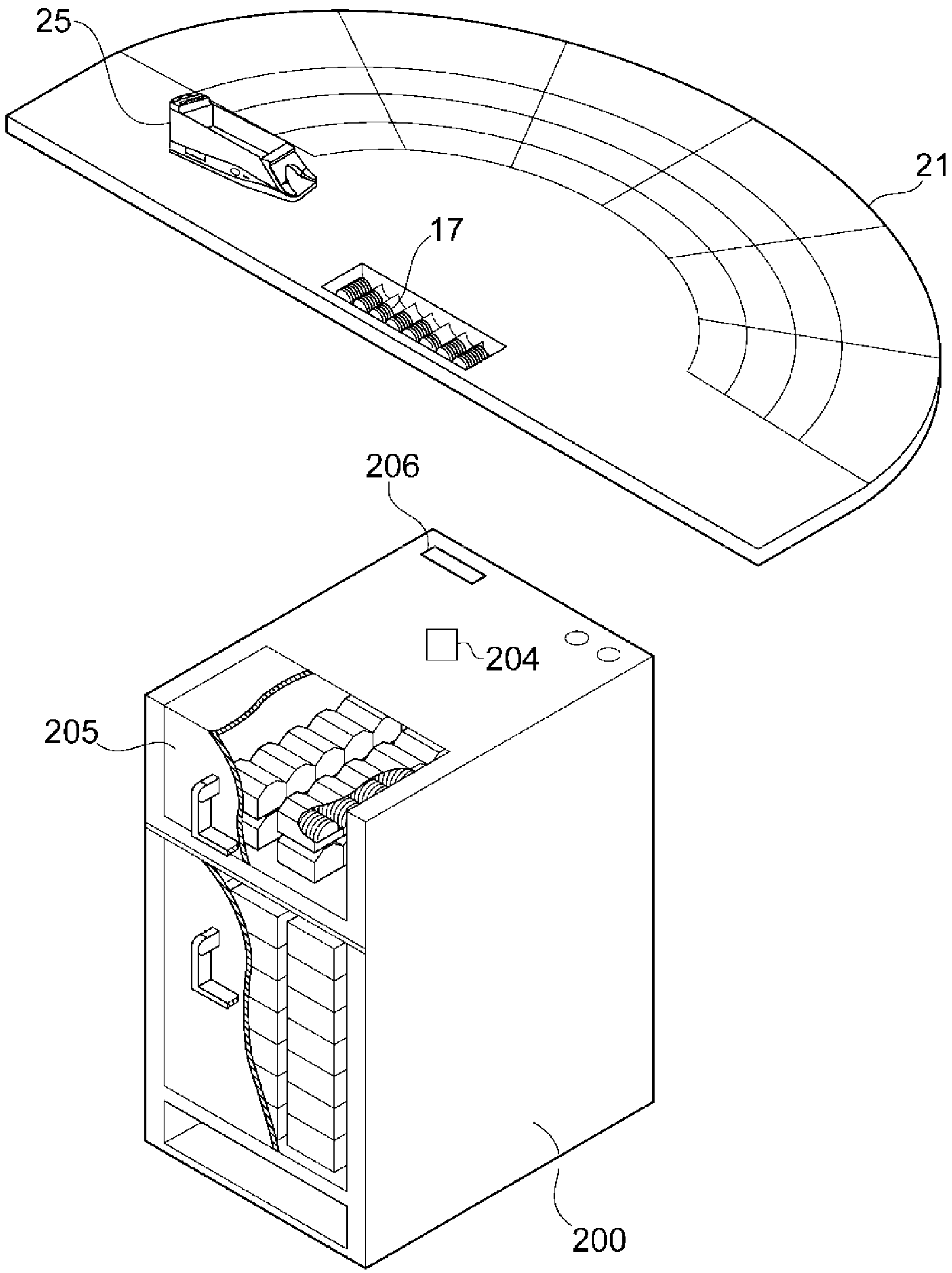
FIG. 7 is a perspective view showing a plurality of packages according to a second embodiment of the present invention and a storage box storing a plurality of chip cases according to an embodiment of the present invention.
Figure 8:
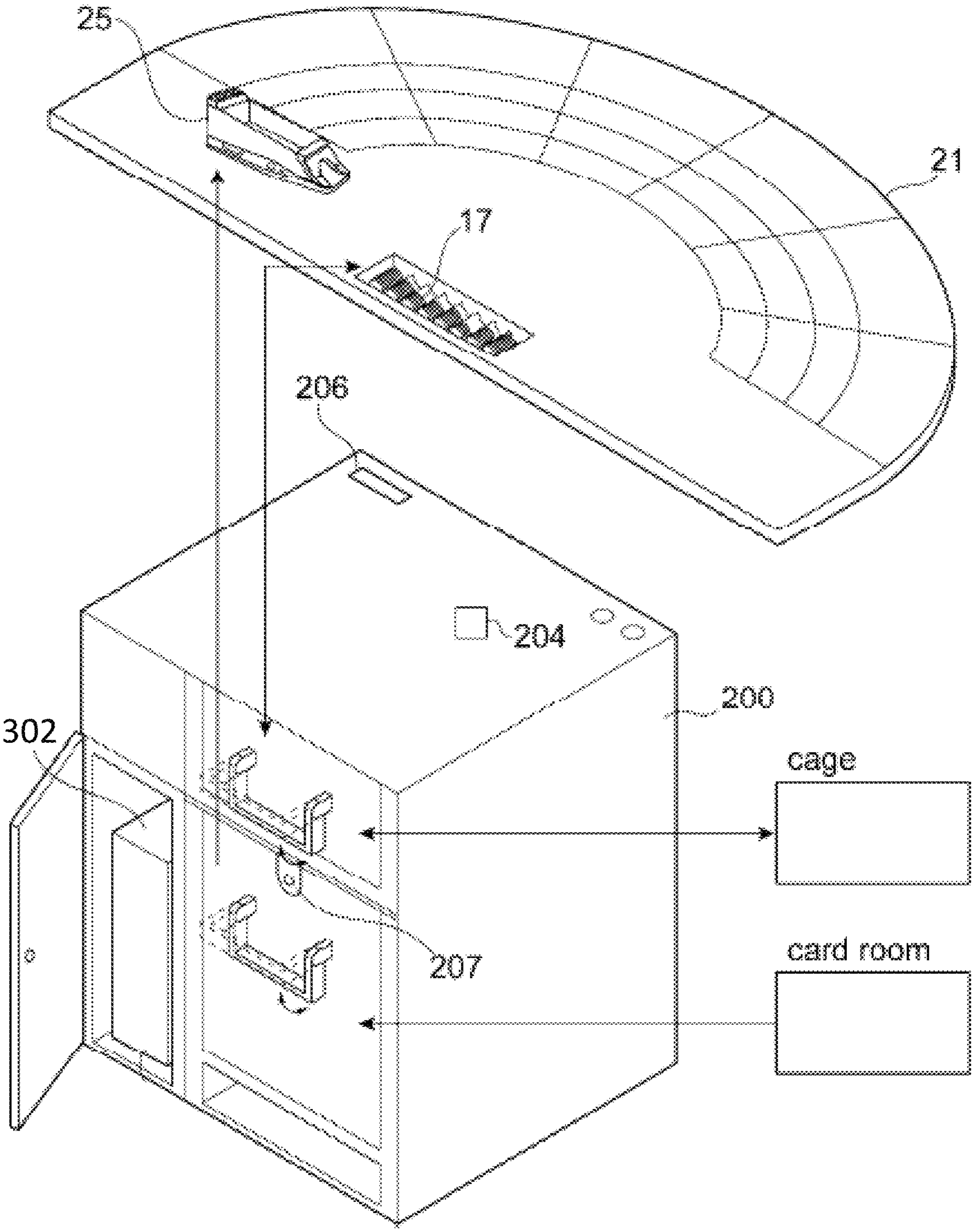
FIG. 8 is a diagram providing an overview of a system that manages packages of shuffled playing cards and chip cases housing gaming chips according to the second embodiment of the present invention.

FIGS. 7 and 8 are explanatory diagrams providing an overview of a management system of gaming chips and packages of shuffled playing cards using the storage box according to the second embodiment of the present invention. The embodiment of the present invention provides a management system of the gaming chips 3 and the packages 302 of the shuffled playing cards 301S to play a game (baccarat). The gaming chips 3 for replenishment are housed in the storage box 200 while being put into the chip case 100 and when the gaming chips 3 in the chip tray 17 run short, the dealer 11 takes out the chip case 100 together with the gaming chips 3 for replenishment from the storage box 200 to set the chip case 100 to the chip tray 17. When the gaming chips 3 in the chip tray 17 become excessive, the excessive gaming chips 3 can be put into the chip case 100 and housed in the storage box 200. The storage box 200 also houses the package 302 to be used for the next game and the dealer 11 takes out the package 302 to be used for the next game from the storage box 200 and sets the shuffled playing cards 301S to the card shooter apparatus 25.

The chip case ID code 103 is attached to the chip case 100 and the chip case ID code 103 attached to the chip case 100 is continuously read by the reader for reading chip case ID 202 installed inside the storage box 200. Also, the package ID code 304 is attached to the package 302 and the package ID code 304 attached to the package 302 is continuously read by a reader for reading package ID 305 installed inside the storage box 200.

The storage box 200 includes one or a plurality of the readers for reading package ID 305 that reads the playing card ID code of all stored shuffled playing cards and also one or a plurality of the chip readers that reads the case ID code of all the stored chip cases.

The control apparatus 204 has a function to output the total numbers of the shuffled playing cards 301S and the chip cases 100 stored in the storage box 200 and all the package ID codes 304 and all the chip case ID codes 103 stored in the storage box 200 by monitoring the playing card ID code read by the reader for reading package ID 305 and the chip case ID code 103 read by the chip reader.

The control apparatus 204 has a function to grasp an increase/decrease of the chip cases 100 housed in the storage box 200 by periodically monitoring the case ID code 103 of the chip case 100 and, when the increase/decrease is grasped, to output the total amount after the increase/decrease of value of all the gaming chips 3 housed in the storage box 200.

Whether the chip case 100 and the package 302 placed in the storage box 200 are inside the storage box 200 may be monitored by the control apparatus 204 at fixed intervals (for example, every one minute, every five minutes, every one hour or more). The storage box 200 may have the reader for reading package ID 305 to read the ID code 304 of the package 302 of shuffled playing cards and the reader for reading chip case ID 202 to read the chip case ID code 103 of the chip case 100 arranged in the drawer 205 of the storage box 200. The reader for reading package ID 305 and the reader for reading chip case ID 202 of the storage box 200 may be a bar code reader BR or the monitoring camera 29 (alternatively, an RFID tag reader or QR code (registered trademark) reader (not shown) may be used instead of the bar code reader BR). The reader for reading package ID 305 and the reader for reading chip case ID 202 may be installed so as to be able to scan in the X direction and Y direction to read all the ID codes 304 of the packages 302 by the scan unit 53 installed in the drawer 205. Also, a transmission unit 206 to transmit information obtained by the reader for reading package ID 305 and the reader for reading chip case ID 202 to the outside of the storage box 200 is provided. The storage box 200 has the lock unit 207 to prevent the package 302 from being taken out from the storage box 200 by opening the drawer 205. The lock unit 207 is unlocked only while an authorized person of a casino takes in or out the package 302 from the storage box 200 (the drawer 205 is opened). Only an authorized person of a casino can operate the lock unit 207.

The storage box 200 includes the lock unit 207 to prevent the drawer 205 from opening and the lock unit 207 may include a warning unit (may be wireless) to notify that the drawer 205 has opened. When a notification that the drawer 205 has opened is received (or when appropriate), the storage box may be imaged by the nearest monitoring camera 29 to record taking in or out of the package 302 of the chip case from the storage box 200 by an authorized person or others. By recording such behavior (images in which the storage box 200 is opened), the fact that the package 302 can be taken in or out from the storage box 200 only while the lock unit 207 is unlocked by an authorized person (while the drawer 205 is opened) can be confirmed. By monitoring such images, the presence of all the packages 302 inside the storage box 200 can be confirmed.

Figure 9:
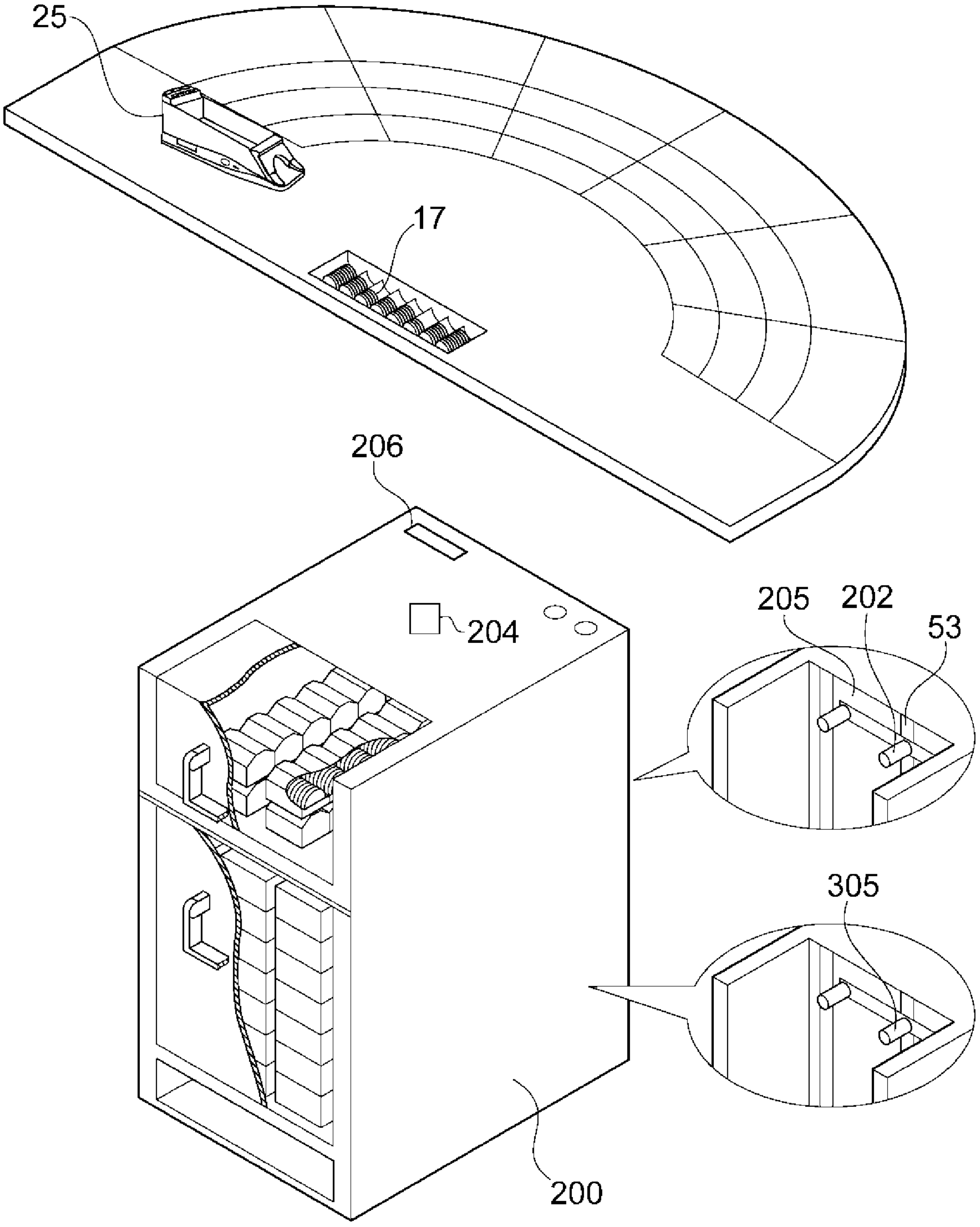
FIG. 9 is a diagram providing an overview of the system that manages packages of shuffled playing cards and chip cases housing gaming chips according to the second embodiment of the present invention.

FIG. 9 is a diagram providing an overview of a system that manages packages of shuffled playing cards and chip cases housing gaming chips according to the second embodiment of the present invention. As another embodiment of the storage box 200, the storage box 200 may have a plurality of the readers for reading package ID 305 to read the package ID code 304 and a plurality of the readers for reading chip case ID 202 to read the chip case ID code 103 in an upper portion inside the storage box 200. By moving each of the scan unit 53 arranged in an upper portion of the storage box 200 in the Y direction, each ID code reader moves in the Y direction to read all of the package ID code 304 of the package 302 in each column below each ID code reader and the chip case ID code 103 of the chip case 100. The storage box 200 has a drawer and the package 302 and the chip case 100 can be taken in or out by opening or closing the drawer. The storage box 200 includes a lock unit 56 to prevent illegal pilfering of the package 302 and the chip case 100. Further, as another idea, the storage box 200 may include as many ID code readers as the maximum numbers of the packages 302 and the chip cases 100 that can be stored in an upper portion inside the storage box 200.

The present embodiment relates to, like the second embodiment, improvements of technology to read ID of the gaming chip 3 and the playing card 6 in the storage box 200. Incidentally, matters described in the first or second embodiment can also be applied to the third embodiment.

When RFID tags are attached to different items such as gaming chips and playing cards for management, RFID tags of the same frequency are normally used and content of each item is written into the RFID tag. Accordingly, content of the item can be recognized by reading the RFID tag. In a clothing store, for example, RF tags using radio waves of the same frequency are attached to socks and shirts and information about whether an item is a shirt or socks (information indicating the type of an item) is written into each RF tag. Then, by reading the RF tag, whether the item is socks or a shirt can be recognized.

For security items like gaming chips and playing cards used in casinos, however, the security level demanded may be different from item to item. Also, circumstances in which RFID tags of all kinds of security items can be read by the same reading device (RFID reader) is dangerous and it is desirable to use a separate reading device for each security item.

The present embodiment is developed in view of the above circumstances, and an object thereof is to improve safety when a plurality of types of security items is managed by RFID.

Figure 10:
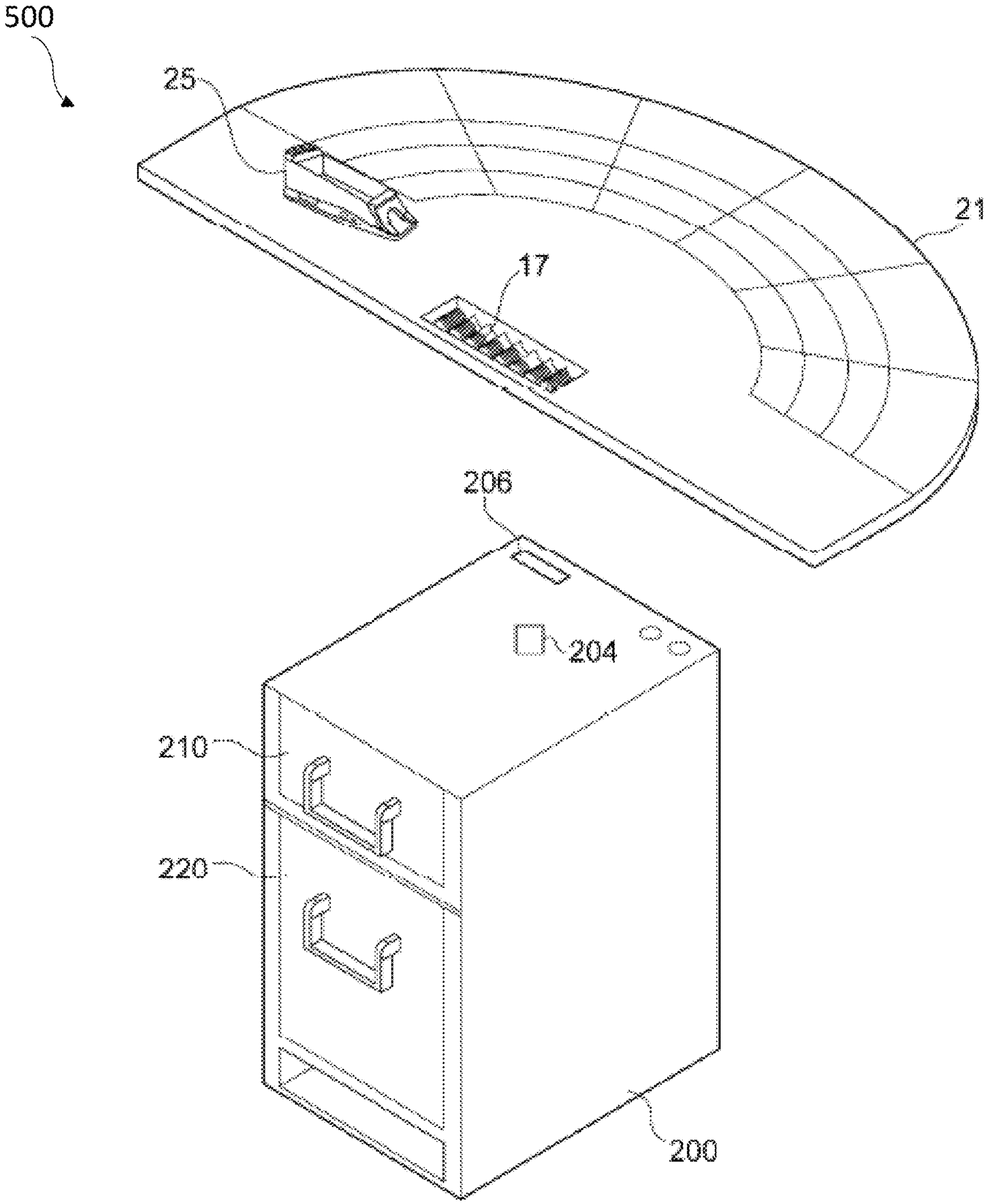
FIG. 10 is a diagram showing the configuration of a system according to a third embodiment of the present invention.

Hereinafter, a system according to the present embodiment will be described specifically with reference to the drawings. In the description that follows, the description is omitted when appropriate by attaching the same reference signs to the same elements as those in the above embodiments. FIG. 10 is a diagram showing the configuration of a system according to the present embodiment. A system 500 manages the package 302 of the shuffled playing cards 301S and the gaming chips 3. The system 500 includes the game table 21 to play card games and the storage box 200 to store the playing cards 6 and the gaming chips 3 used in card games.

The game table 21 is formed linearly on a side corresponding to the dealer position where the dealer is positioned and formed like an elliptic curve on a side corresponding to the player position where players are positioned. The chip tray 17 to house the gaming chips 3 of the dealer is provided in front of the dealer position of the game table 21. Games are played on the game table 21 using the playing cards 6 and the gaming chips 3.

The chip tray 17 is embedded in the game table 21 by a removable method. The dealer collects the gaming chips 3 bet by the losing player from the game table 21 and houses the gaming chips 3 in the chip tray 17 and then pays out the gaming chips 3 to the winning player from the chip tray 17.

The gaming chip 3 to be used is the same as that described in the first embodiment and contains the RFID tag 125 as a wireless tag and also has a striped pattern on the side face. In the RFID tag 125, chip ID that uniquely identifies the gaming chip 3 and information indicating value of the gaming chip 3 are stored. Also, the color of the striped pattern on the side face indicates value of the gaming chip 3.

The card shooter apparatus 25 is installed on the game table 21. The card shooter apparatus 25 is configured in the same manner as in the first embodiment and playing cards of the predetermined number of decks pulled out from the package 302 are housed in the card shooter apparatus 25 and taken out one by one from an outlet by the dealer to be submitted to a card game.

Playing cards housed in the card shooter apparatus 25 are provided as the package or container (hereinafter, simply called "package") 302. Playing cards constituting the predetermined number of decks are shuffled randomly and individually constituted as the package 302. The package 302 is configured in the same manner as in the first embodiment. In the present embodiment, an RFID tag 306 is attached to the package 302 as a wireless tag. Package ID that uniquely identifies each of the packages 302 is stored in the RFID tag 306. Incidentally, the RFID tag 306 may be embedded or included in the package 302.

The storage box 200 has a cabinet form and has a plurality of drawers. In the present embodiment, an upper drawer is a chip drawer 210 as a chip storage box or chip storage means that houses the gaming chips 3 and a lower drawer is a card drawer 220 as a card storage box or card storage means that houses the packages 302 of shuffled playing cards. That is, the gaming chips 3 and the packages 302 are housed in different drawers of the storage box 200. Also, the storage box 200 is integrally configured by including the chip drawer 210 as a chip storage box and the card drawer 220 as a card storage box.

The chip drawer 210 stores a plurality of the gaming chips 3 used on the game table 21. The card drawer 220 stores a plurality of the packages 302 of shuffled playing cards carried from a card room and inserted into the card shooter apparatus 25 on the game table 21. The chip drawer 210 and the card drawer 220 include the lock unit 207 as an opening/closing lock apparatus.

The storage box 200 is arranged in the dealer position under the game table 21 as a position easy to access from the dealer and difficult to access from players. Also, the storage box 200 is provided with the control unit 204 and the transmission unit 206 similar to those in the first embodiment. The control unit 204 is configured by a management program in the present embodiment being executed by a computer including a storage apparatus. The transmission unit 206 communicates with other devices by wire or by wireless.

Figure 11:
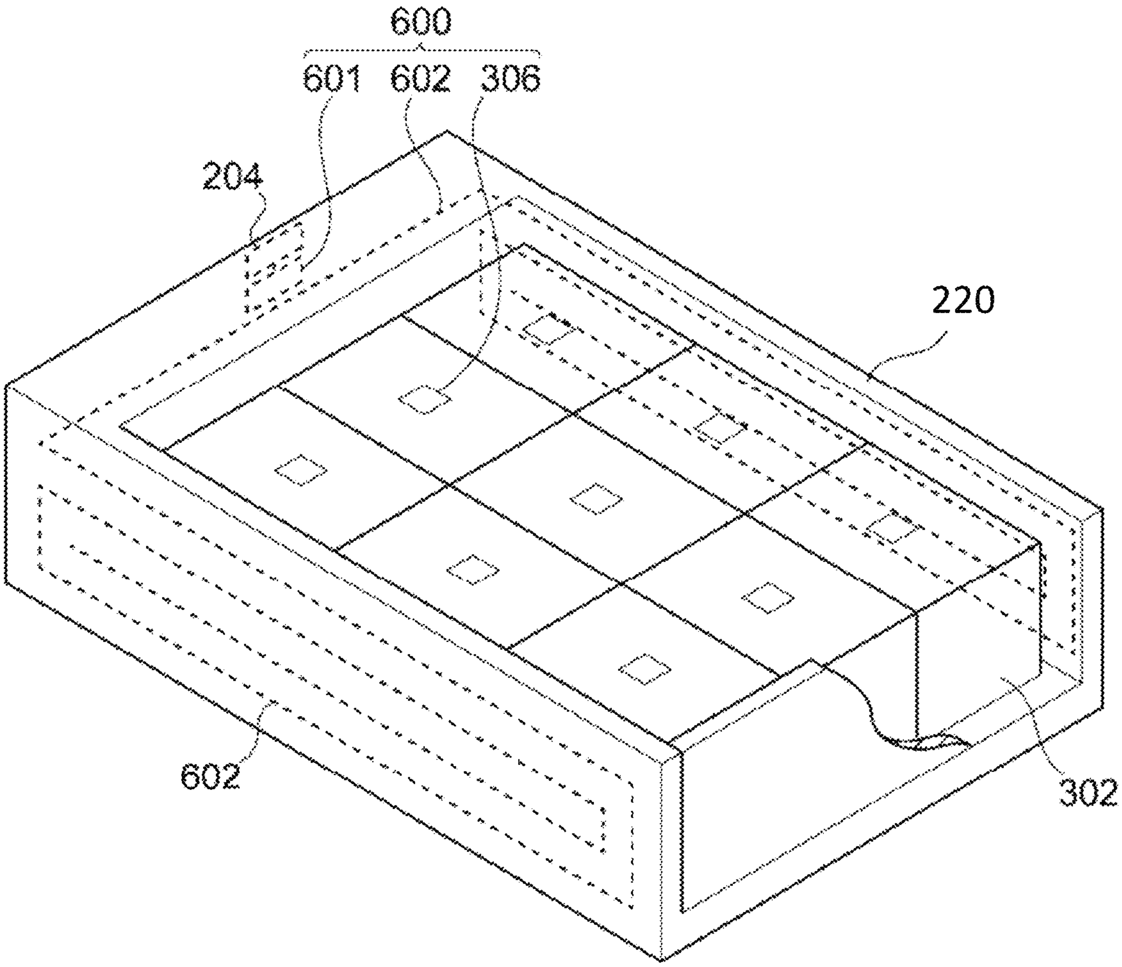
FIG. 11 is a perspective view of an example of a drawer for cards according to the third embodiment of the present invention.

FIG. 11 is a perspective view of an example of the card drawer 220. The card drawer 220 of the example in FIG. 11 has a size capable of housing three units of the package 302 in the width direction and three units in the depth direction, and maximally nine units of the package 302. A card antenna 602 to read the RFID tag 306 attached to the package 302 is contained in the sidewall on the left and right of the card drawer 220. The card antenna 602 may also be affixed to the inner surface of the sidewall.

The storage box 200 further includes a reader for reading package ID 601 connected to the card antenna 602 and the reader for reading package ID 601 is connected to the control unit 204. The reader for reading package ID 601 is an RFID reader and reads information stored in the RFID tag 306 attached to the package 302 via the card antenna 602. The card antenna 602 extends in the depth direction of the sidewall and can read the RFID tag 306 of all the packages 302 housed in the card drawer 220. The card RFID reader 601, the card antenna 602, and the RFID tag 306 attached to the package 302 constitute a card RFID system 600.

Figure 12:
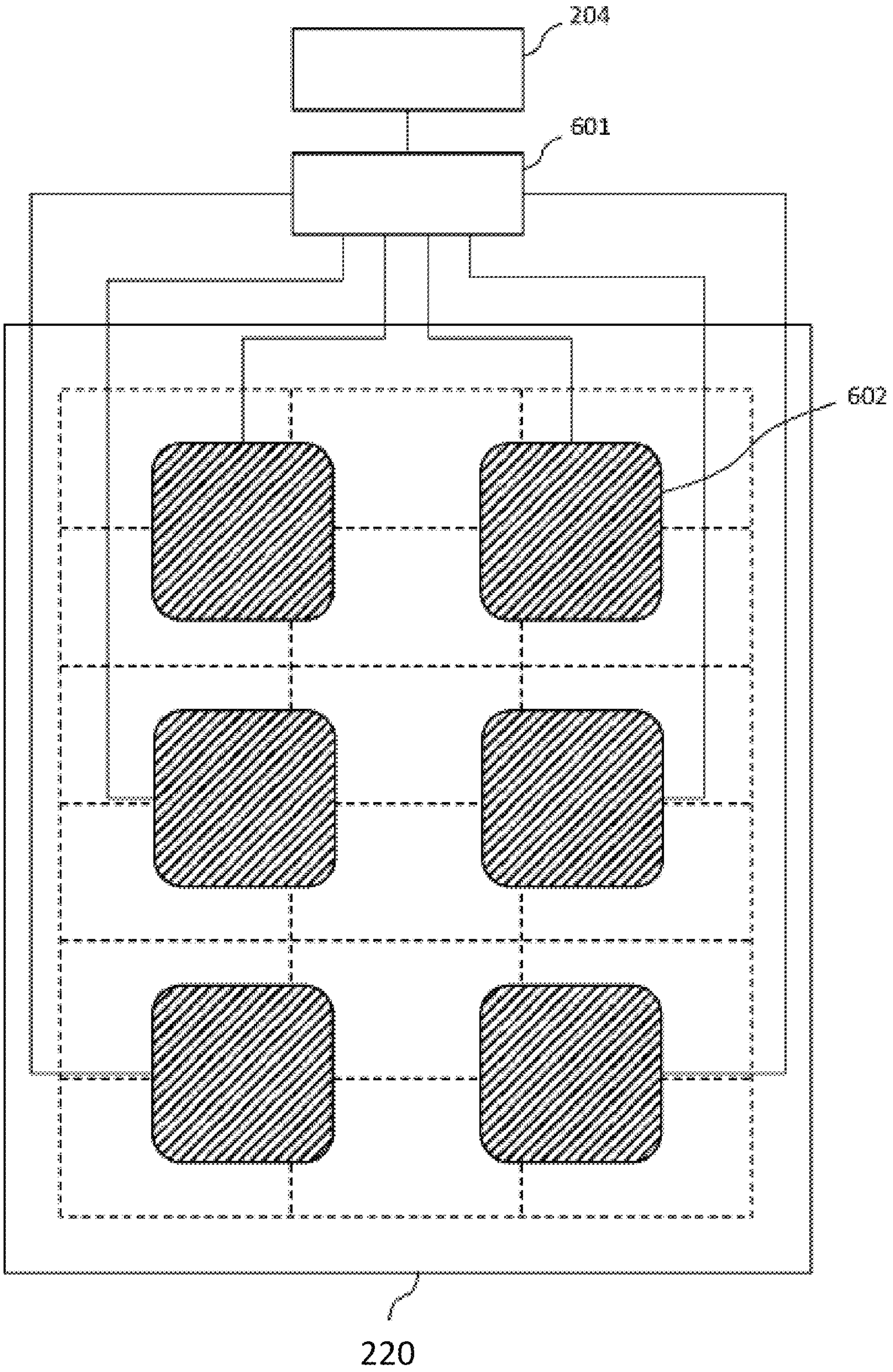
FIG. 12 is a plan view of another example of the drawer for cards according to the third embodiment of the present invention.

FIG. 12 is a plan view of another example of the card RFID system 600. The card drawer 220 of the card RFID system 600 in this example has a size capable of housing three units of the package 302 in the width direction, six units in the depth direction, and maximally 18 units of the package 302. A total of six units of the card antenna 602, two units in the width direction and three units in the depth direction are provided on the undersurface of a member covering the card drawer 220 on the storage box 200 from above (a member partitioning the chip drawer 210 and the card drawer 220). Using the six units of the card antenna 602, the RFID tags 306 attached to 18 units of the package 302 that can be housed.

The six units of the card antenna 602 are connected to the card RFID reader 601 as a reader for reading package ID. In this case, a plurality of the card RFID readers 601 is provided and one of the card RFID readers 601 may be connected to one of the card antennas 602 or one of the card RFID readers 601 may be connected to a plurality of the card antennas 602. Thus, the RFID tags 306 of all the packages 302 housed in the card drawer 220 can be read by one or the plurality of card RFID readers 601.

In the example of FIG. 12, the card antenna 602 is provided in a plate member partitioning the chip drawer 210 and the card drawer 220 in the storage box 200, but instead, the card antenna 602 may be provided at the bottom of the card drawer 220 in the same arrangement as in FIG. 12.

Figure 13:
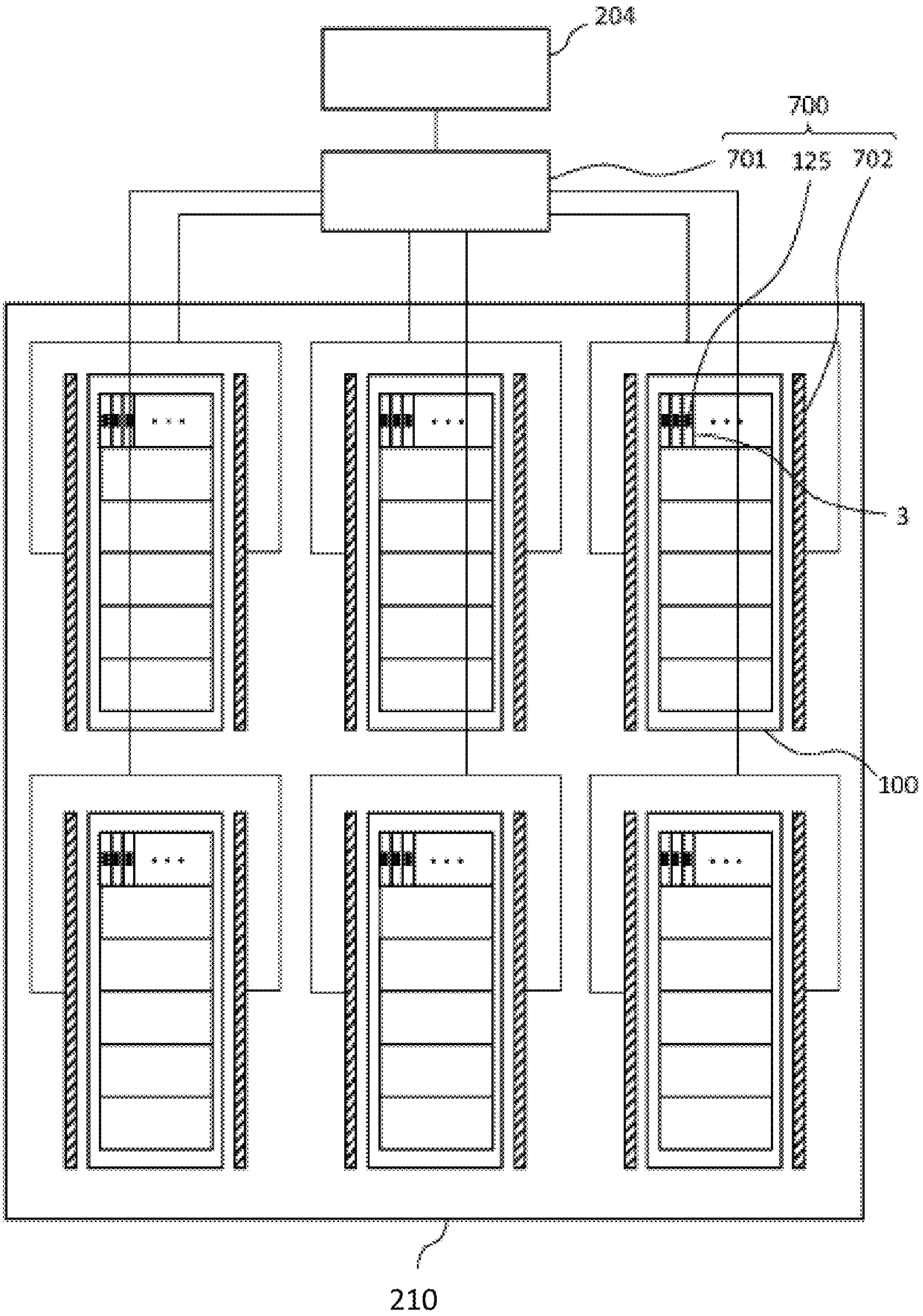
FIG. 13 is a plan view of an example of a drawer for gaming chips according to the third embodiment of the present invention.

FIG. 13 is a plan view of an example of a chip RFID system 700. In the example of FIG. 13, the chip RFID system 700 has a size capable of housing three units of the chip case 100 in the width direction and two units in the depth direction, and maximally six units of the chip case 100. Incidentally, the chip case 100 is configured in the same manner as the chip case 100 in the first embodiment. That is, the chip case 100 has a plurality of columns housing the gaming chips 3 by being stacked in the thickness direction and the chip case 100 can house 100 pieces of the gaming chips 3.

A pair of left and right chip antennas 702 sandwiching the chip case 100 from both sides are provided in each housing position of the six units of the chip case 100. The chip antenna 702 is provided on the undersurface of a member covering the chip drawer 210 (a top plate of the storage box 200) in the storage box 200 and extends downward. The chip antenna 702 is connected to a chip RFID reader 701 as a reader for reading chip ID. In this case, a plurality of the chip RFID readers 701 is provided and one of the chip RFID readers 701 may be connected to one of the chip antennas 702 or one of the chip RFID readers 701 may be connected to a plurality of the chip antennas 702. Thus, information stored in the RFID tags 125 of all the gaming chips 3 housed in the chip drawer 210 can be read by one or the plurality of chip RFID readers 701. The chip RFID reader 701, the chip antenna 702, and the RFID tag 125 contained in the gaming chip 3 constitute a chip RFID system 700.

In the example of FIG. 13, the chip antenna 702 is provided in the top plate of the storage box 200, but instead, the chip antenna 702 may also be provided on the upper surface of the bottom of the chip drawer 210 in the same arrangement as in FIG. 13.

Hereinafter, control of the control unit 204 will be described. First, the control unit 204 has a function similar to that in the first and second embodiments. The control unit 204 grasps the number of the packages 302 housed in the card drawer 220 of the storage box 200 and their package IDs based on read results of the RFID tag 306 attached to the package 302 by the card RFID system 600.

Also, the control unit 204 grasps the number of the gaming chips 3 housed in the chip drawer 210 of the storage box 200, their chip IDs, and value thereof based on read results of the RFID tag 125 contained in the in the gaming chip 3 by the chip RFID system 700. The control unit 204 further determines the total amount of value of the gaming chips 3 housed in the chip drawer 210 based on the number of each value of the gaming chips 3 housed in the chip drawer 210.

The card RFID system 600 and the chip RFID system 700 periodically read the RFID tag 125 and the RFID tag 306 at predetermined intervals and output read results to the control unit 204 together with table ID that identifies the game table 21. The control unit 204 monitors read results of the card RFID system 600 and the chip RFID system 700 and, when read results vary, detects the variations and records the table ID and read results in the storage apparatus together with the relevant date and time. Instead, the control unit 204 may record all read results of the card RFID system 600 and the chip RFID system 700 in the storage apparatus together with the relevant date and time and table ID. Alternatively, the control unit 204 and the lock unit 207 may be linked so that the control unit 204 records read results when the lock unit 207 is unlocked.

A warning unit (for example, a warning lamp or an alarm output speaker) may be connected to the control unit 204. In such a case, all package IDs and chip IDs that can be detected are stored in the storage apparatus of the control unit 204 and the control unit 204 determines whether the read package ID or chip ID matches one of package IDs and chip IDs stored in the storage apparatus. If the read package ID or chip ID matches none of package IDs and chip IDs stored in the storage apparatus, the control unit 204 may control the warning unit to output a warning (for example, a warning lamp is turned on or an alarm is output from an alarm output speaker).

If two units of the package 302 or more decrease at a time (the package 302 is normally fetched one unit at a time) or the number of the gaming chips 3 is not a multiple of 100 (100 pieces of the gaming chips 3, which is the maximum number that can be housed, are normally housed in the chip case 100 before being housed in the chip drawer 210), the control unit 204 detects such movement as illegal movement of the package 302 or the gaming chip 3 and may record the movement or output an alarm.

In the storage box 200, as described above, the housing location of the gaming chips 3 and that of the packages 302 are physically separated, but are only separated inside the storage box 200 and are not apart on the order of meters. Thus, it is necessary to avoid interference between the card RFID system 600 and the chip RFID system 700.

In the present embodiment, therefore, different frequencies are adopted for the card RFID system 600 and the chip RFID system 700. A specific example is as follows: In the present embodiment, the electromagnetic induction type is adopted for the chip RFID system 700 and its frequency band used is the HF band (MODE3). The HF band (MODE3) is a short-wave band of 13.56 MHz. The chip antenna 702 is formed in a coil shape. Also, the RFID tag 125 contained in the gaming chip 3 is provided with a coil-shaped antenna. The antenna of the gaming chip 3 transmits/receives radio waves of the HF band to/from the chip antenna 702 and also obtains operating power of the RFID tag 125 by receiving radio waves of the HF band from the chip antenna 702.

The HF band has a short communication range and directivity and thus, the area to be read can be limited to a predetermined range and reading of the gaming chip 3 in a position that should not be read can intentionally be prevented. When the RFID tag 125 of the gaming chip 3 housed in the chip tray 17 is read, the RFID tag 125 of the gaming chip 3 on the game table 21 can be prevented from being read. Further, when the gaming chip 3 housed in the chip tray 17 is read, each column can be read while avoiding interference between columns by dividing the antenna for each column. The gaming chips 3 are used and managed by being stacked and by using the HF band, reading can be done even if the gaming chips 3 are stacked and a plurality of the RFID tags 125 are congested.

On the other hand, the radio wave type is adopted for the card RFID system 600. Its frequency band is the UHF band and ultra-high frequencies in the 900 MHz band are used. The card antenna 602 radiates radio waves to space. The RFID tag 306 is also provided with an antenna and radio waves radiated to space are received by this antenna. The UHF band (ultra-high frequency) has higher frequencies than the HF band (short-wave band) and thus, the wavelength becomes shorter, which is advantageous for miniaturization of the antenna. In addition, the UHF band generally has a longer communication range than the HF band.

In the present embodiment, as shown in FIG. 12, a patch antenna is used as the card antenna 602 of the card RFID system 600 using the UHF band and a dipole antenna is used for the RFID tag 306 of the package 302. The RFID tag used in the UHF band is generally small and its memory capacity is small and so can be manufactured at low cost. The package 302 is disposed of after playing cards are used together with playing cards and thus, being at low cost is advantageous. Because the communication range of the UHF band is long, even if the packages 302 are put in a carton or further stacked on a pallet, the packages 302 contained in such a carton or pallet can be read together.

Figure 14:
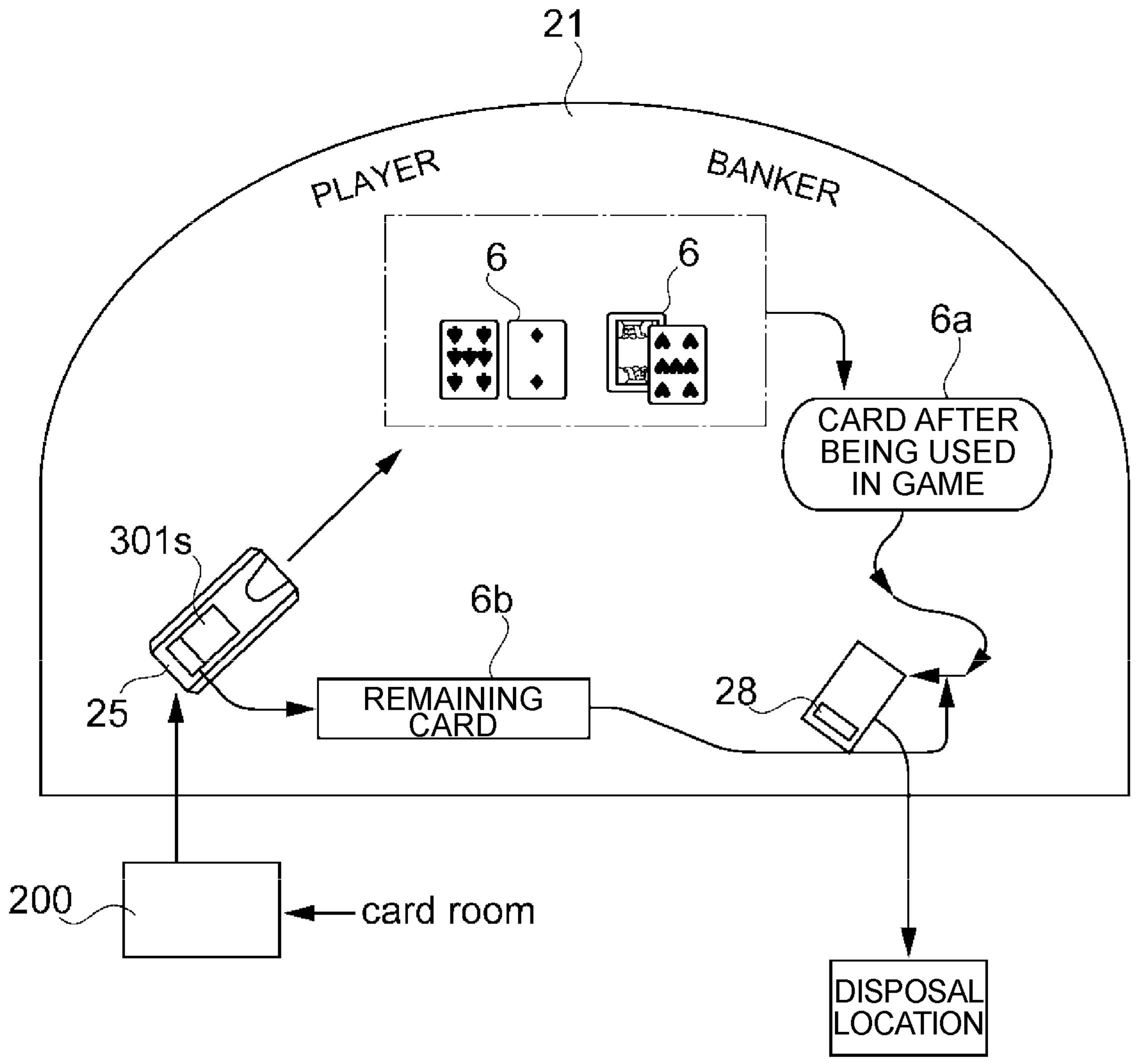
FIG. 14 is an explanatory diagram showing movement of cards 6 in a management system using the storage box according to the third embodiment of the present invention.

FIG. 14 is an explanatory diagram showing movement of the cards 6 in a management system using the storage box according to the third embodiment of the present invention. The playing cards 6 are housed and stored in the package 302 in a card room. The package 302 includes the playing cards 6 (shuffled playing cards 301S) of eight decks aligned in random order by being shuffled. The storage box 200 is provided for each of the game tables 21. When the stock of the package 302 in the storage box 200 gets short, the storage box 200 is replenished with the package 302 from the card room. In such a case, the storage box 200 may be replenished with a pallet of a plurality of the packages 302 (for example, nine packages) from the card room.

The card shooter apparatus 25 is installed on the game table 21. Also, the game table 21 is provided with a disposal port 28 into which the playing card 6 to be disposed of is inserted. In a card game (baccarat in the present embodiment), the playing cards 6 are pulled out one by one from the card shooter apparatus 25 by the dealer and placed on the game table 21. When one game ends, playing cards 6*a* on the game table 21 used for the game are disposed of through the disposal port 28. When a cut card is drawn from the card shooter apparatus 25, playing cards 6*b* remaining in the card shooter apparatus 25 are disposed of through the disposal port 28. The playing cards 6 disposed of through the disposal port 28 are transported to the disposal location.

According to the present embodiment, as described above, the card RFID system 600 and the chip RFID system 700 use mutually different frequencies to prevent interference of radio waves with each other and read errors due to interference of package ID attached to the package 302 and chip ID attached to the gaming chip 3 are minimized. To reliably prevent interference, a shielding means (for example, a shielding plate) that blocks radio waves may be provided between chip drawer 210 and the card drawer 220.

In the above embodiments, card ID that uniquely identifies the package 302 of shuffled playing cards is attached to the package 302, but as a modification, in place thereof or in addition thereto, the card RFID system 600 may be constructed by causing each of the playing cards 6 to contain the RFID tag. In such a case, card ID that uniquely identifies each of the playing cards 6 is stored in the RFID tag contained in each of the playing cards 6.

In the above embodiments, chip ID that uniquely identifies the gaming chip 3 is attached to each of the gaming chips 3, but as a modification, in place thereof or in addition thereto, the chip RFID system 700 may be constructed by attaching the RFID tag to the chip case 100. In such a case, chip case ID that uniquely identifies the chip case is stored in the RFID tag attached to each of the chip cases 100.

Also in these modifications, mutual interference can be prevented by adopting frequencies of radio waves used by the card RFID system 600 and the chip RFID system 700.

Further, in the above embodiments and their modifications, the RFID tag is caused to store code information that uniquely identifies an item (the package 302, the gaming chip 3 and the like) to which the RFID tag is attached, but information stored in the RFID tag may be other information. For example, the RFID tag may be caused to store information indicating the type of an item to which the RFID tag is attached (for example, information indicating a package to the RFID tag 306 attached to the package 302 and information indicating a gaming chip to the RFID tag 125 contained in the gaming chip 3). Also in this case, the numbers of the packages 302 and the playing cards 6 can be grasped by the card RFID system 600 and the numbers of the gaming chips 3 and the chip cases 100 can be grasped by the chip RFID system 700.

Also in the above embodiments, frequencies of the UHF band are used for the card RFID system 600 and frequencies of the HF band are used for the chip RFID system 700, but as long as frequency bands used for the card RFID system 600 and the chip RFID system 700 are different, frequencies of radio waves used for the card RFID system 600 and the chip RFID system 700 are not limited to the above example.

Also in the above embodiments, the card RFID system 600 adopts the radio wave type and the chip RFID system 700 adopts the electromagnetic induction type, but the types of the card RFID system 600 and the chip RFID system 700 are not limited to the above types and appropriate types may be adopted in accordance with the frequency band of radio waves to be used and other factors.

To solve the above conventional problems, a system that manages packages of shuffled playing cards and gaming chips according to the present invention includes shuffled playing cards having playing cards constituting a predetermined number of decks shuffled in random order and integrally constituted individually as a cage that manages one container or package with a unique playing card ID code attached to the cage managing the container or package, a chip case housing gaming chips having a chip ID code and to which a case ID code is attached, a game table on which a game is played using the shuffled playing cards and the gaming chips, a storage box installed beside the game table to store a plurality of the shuffled playing cards carried from a card room and inserted into a card shooter apparatus on the game table and also to store a plurality of the chip cases housing the gaming chips used on the game table and including an opening/closing mechanism enabling taking out of the shuffled playing cards and the chip tray, and a control apparatus to manage the shuffled playing cards and the gaming chips, the storage box includes one or a plurality of card readers that reads playing card ID codes of all stored shuffled playing cards and also one or a plurality of chip readers that reads case ID codes of all stored chip cases, and the control apparatus has a function to output total numbers of the shuffled playing cards and the chip cases and also all the playing card ID codes and the case ID codes stored in the storage box by monitoring the playing card ID codes read by the card reader and the case ID codes read by the chip reader.

Further, the storage box includes a lock unit configured to prevent taking out of the shuffled playing cards and the chip cases of gaming chips from the storage box.

Further, the storage box may have a shuffled playing card storage box that stores the shuffled playing cards and a chip storage box that houses the gaming chips by allowing the gaming chips to be taken in or out independently.

Further, the case ID code of the chip case is associated with the chip ID code of the gaming chip in the case and the control apparatus has a function to output a total amount of value of all the gaming chips housed in the storage box by acquiring all the case ID codes housed in the storage box.

Further, the control apparatus has a function to grasp an increase/decrease of the chip cases housed in the storage box by periodically monitoring the case ID code of the chip case and, when the increase/decrease is grasped, to output the total amount after the increase/decrease of the value of all the gaming chips housed in the storage box.

To solve the above conventional problems, a system that manages packages of shuffled playing cards and gaming chips according to the present invention may be configured as described below: A system including shuffled playing cards in which playing cards constituting a predetermined number of decks are shuffled in random order and which are integrally constituted individually as one container or package with a unique playing card ID code attached to the container or package, a chip case housing gaming chips having a chip ID code, a game table on which a game is played using the shuffled playing cards and the gaming chips, a storage box installed beside the game table to store a plurality of the shuffled playing cards carried from a card room and inserted into a card shooter apparatus on the game table and also to store a plurality of the chip cases housing the gaming chips used on the game table and including an opening/closing mechanism enabling taking out of the shuffled playing cards and the chip tray, and a control apparatus to manage the shuffled playing cards and the gaming chips, the storage box includes one or a plurality of card readers that reads playing card ID codes of all stored shuffled playing cards and also one or a plurality of chip readers that reads chip ID codes of all stored gaming chips, and the control apparatus has a function to output total numbers of the shuffled playing cards and the gaming chips and also all the playing card ID codes and the chip ID codes stored in the storage box by monitoring the playing card ID codes read by the card reader and the chip ID codes read by the chip reader.

Further, the control apparatus has a function to output a total amount of value of all the gaming chips housed in the storage box by reading all the chip ID codes present in the storage box.

Further, the storage box includes a lock unit configured to prevent taking out of the shuffled playing cards and the chip cases of gaming chips from the storage box.

Further, the storage box has a shuffled playing card storage box that stores the shuffled playing cards and a chip storage box that houses the gaming chips by allowing the gaming chips to be taken in or out independently.

Further, the control apparatus may have a function to grasp an increase/decrease of the gaming chips housed in the storage box by periodically monitoring the chip ID code of the gaming chip stored in the storage box and, when the increase/decrease is grasped, to output the total amount after the increase/decrease of the value of all the gaming chips housed in the storage box.

To solve the above conventional problems, a storage box according to the present invention is a storage box that manages shuffled playing cards and gaming chips, wherein the storage box is carried is carried from a card room to store a plurality of shuffled playing cards and also makes available the shuffled playing cards by individually taking out and inserting the shuffled playing cards into a card shooter apparatus on a game table and further stores a plurality of chip cases housing gaming chips used on the game table to adjust a quantity of the gaming chips on the game table using the chip cases when the gaming chips on the game table are excessive or lacking in accordance with development of a game on the game table and also to be able to store the gaming chips that are excessive before being transferred to a cage that manages the gaming chips of a casino and includes an opening/closing mechanism arranged near the game table to enable taking out of the shuffled playing cards and gaming chips when necessary, the shuffled playing cards have playing cards constituting a predetermined number of decks shuffled in random order and are integrally constituted individually as one container or package with a unique playing card ID code attached to the container or package, the gaming chip has a chip ID code and is housed in the chip case to which a case ID code is attached, the storage box includes one or a plurality of card readers that reads the playing card ID code of all the shuffled playing card stored and also one or a plurality of chip readers that reads the case ID code of all the chip cases stored or the chip ID code of the gaming chips in the chip cases, and a control apparatus has a function to output total numbers of the shuffled playing cards and the chip cases stored in the storage box and also all the playing card ID codes and the case ID codes or chip ID codes stored in the storage box by monitoring the playing card ID codes read by the card reader and the case ID codes or chip ID codes read by the chip reader.

Further, the storage box may include a lock unit configured to prevent taking out of the shuffled playing cards or the gaming chips from the storage box.

Further, the storage box may include a shuffled playing card storage box that stores the shuffled playing cards and a chip storage box that houses the gaming chips by allowing the gaming chips to be taken in or out independently.

Further, the control apparatus may have a function to output a total amount of value of all the gaming chips housed in the storage box by reading all the chip ID codes present in the storage box.

Further, the case ID code of the chip case may be associated with the chip ID code of the gaming chip in the case and the control apparatus may have a function to output a total amount of value of all the gaming chips housed in the storage box based on the case ID code by acquiring all the case ID codes housed in the storage box.

To solve the above conventional problems, a system that manages gaming chips according to the present invention includes a chip case that houses gaming chips having a chip ID code, a storage box that stores a plurality of the chip cases housing the gaming chips used on a game table, adjusts a quantity of the gaming chips on a chip float of the game table using the chip cases when the gaming chips placed on the chip float of the game table are excessive or lacking in accordance with development of a game on the game table and also is able to store the gaming chips that are excessive before being transferred to a cage that manages the gaming chips of a casino and includes an opening/closing mechanism arranged beside the game table to enable taking out of shuffled playing cards and the chip tray when necessary, the game table on which a game is played using the gaming chips, and a control apparatus to manage the gaming chips, wherein the storage box includes one or a plurality of chip readers that reads chip ID codes of all stored gaming chips, and the control apparatus has a function to output a total number of the gaming chips stored in the storage box and all the chip ID codes stored in the storage box by monitoring the chip ID code read by the chip reader.

Further, the control apparatus may have a function to output a total amount of value of all the gaming chips housed in the storage box by reading all the chip ID codes present in the storage box.

Further, the storage box may include a lock unit configured to prevent taking out of the chip cases of gaming chips from the storage box.

Further, the control apparatus may have a function to grasp an increase/decrease of the gaming chips housed in the storage box by periodically monitoring the chip ID code of the gaming chip stored in the storage box and, when the increase/decrease is grasped, to output the total amount after the increase/decrease of the value of all the gaming chips housed in the storage box.

Further, the control apparatus may have a function to output whether an increase/decrease amount or increase/decrease value of the gaming chips placed on the chip float of the game table or an increase/decrease amount or increase/decrease value of the gaming chips placed in the cage that manages the gaming chips of a casino and an increase/decrease amount or increase/decrease value of the gaming chips housed in the storage box match.

Further, a case ID code may be attached to the chip case and associated with the chip ID code of the gaming chip in the case.

An aspect of the present invention is a system that manages a package of shuffled playing cards and gaming chips including the shuffled playing cards, wherein the system includes shuffled playing cards having playing cards constituting a predetermined number of decks shuffled in random order and integrally constituted individually as one container or package with a unique card ID attached to the container or package, the gaming chip having a chip ID, a game table on which a game is played using the shuffled playing cards and the gaming chips, a card storage box that stores a plurality of the shuffled playing cards carried from a card room and inserted into a card shooter apparatus on the game table, and a chip storage box that stores a plurality of the gaming chips used on the game table and includes an opening/closing lock mechanism, the card ID and the chip ID are identified using a wireless tag, the card storage box and the chip storage box includes one or a plurality of card readers that reads the card ID of all the shuffled playing cards stored and one or a plurality of chip readers that reads the chip ID of all the gaming chips stored, and the card reader and the chip reader are constructed of readers using mutually different frequencies or modes to manage the shuffled playing cards and gaming chips by minimizing read errors by wireless tags of the read ID and the chip ID.

In the above system, the card ID may use a wireless tag of UHF and the chip ID may use a wireless tag of HF.

The above system may further include a control unit that is connected to the card reader and the chip reader and, when variations of information read by the card reader or information read by the chip reader occur, detects the variations.

In the above system, the card reader may read information of the card wireless tag by a radio wave method and the chip reader may read information of the chip wireless tag by an electromagnetic induction method.

Another aspect of the present invention is a system that manages playing cards to which card information is attached by a card RFID tag and gaming chips to which chip information is attached by a chip RFID tag including a storage unit integrally constructed by including a card storage unit to store the playing cards and a chip storage unit to store the gaming chips, a card RFID reader that reads information of an RFID tag attached to the playing cards stored in the card storage unit, and a chip RFID reader that reads information of an RFID tag attached to the gaming chips stored in the chip storage unit, wherein the card RFID reader and the chip RFID reader read information of each RFID using different frequencies.

In the above system, the card information may be attached to a package including a plurality of playing cards and the chip information may be attached to each of the gaming chips.

In the above system, the card RFID tag may be attached to the package and the chip RFID tag may be attached to the gaming chips.

In the above system, the card RFID tag may be contained in the playing cards and the card information may be attached to each of the playing cards.

The above system may further include a control unit that is connected to the card RFID reader and the chip RFID reader and, when variations of information read by the card RFID reader or information read by the chip RFID reader occur, detects the variations.

In the above system, the card RFID reader may read information of the card RFID tag by a radio wave method and the chip RFID reader may read information of the chip RFID tag by an electromagnetic induction method.

Still another aspect of the present invention is a storage box to manage playing cards to which card information is attached by a card RFID tag and gaming chips to which chip information is attached by a chip RFID tag including a card storage unit to store the playing cards, a chip storage unit to store the gaming chips, a card antenna to read the card information of the playing cards stored in the card storage unit, and a chip antenna to read the chip information of the gaming chips stored in the chip storage unit, wherein information is read by using mutually different frequencies.

What is claimed is:

1. A management system comprising:

a game table at which a game is playable using playing cards and chips containing radio frequency identification (RFID) tags which store chip IDs;

a chip float provided on the game table, into which the chips can be collected by a dealer during the game, and from which the chips can be paid out by the dealer during the game;

a storage area provided beside the game table, separately from the chip float, and in which the chips can be stored;

a first antenna, wherein the first antenna is configured to read the RFID tags contained in the chips accommodated in the chip float to obtain the chip IDs;

a second antenna, wherein the second antenna is configured to read the RFID tags contained in the chips stored in the storage area to obtain the chip IDs; and a controller, wherein the controller is configured to use the readings of the first antenna and the second antenna to identify a listing of the chip IDs that are of the chips in the chip float and the storage area combined, wherein the controller determines whether an amount or value of chips taken from a cage that manages the chips of a casino match an increased amount or an increased value of chips at the game table.

2. The management system according to claim 1, further comprising a warning device, wherein the warning device is configured to notify that the storage area has opened to take the chips in or out from the storage area.

3. The management system according to claim 1, further comprising a recording device, wherein the recording device is configured to record taking in or out of the chips from the storage area.

4. The management system according to claim 3, wherein the recording device is configured to record the taking in or out of the chips from the storage area in response to the storage area being opened.

5. The management system according to claim 4, wherein the recording device is configured not to record the taking in or out of the chips from the storage area when an opening of the storage area does not occur.

6. The management system according to claim 1, wherein the controller is configured to determine one of:

respective total numbers of the chips in the chip float and of the chips in the storage area;

which of the chip IDs are of the chips in the chip float and which of the chip IDs are of the chips in the storage area; and respective total values of the chips in the chip float and of the chips in the storage area.

7. The management system according to claim 1, wherein the controller is configured to output whether a change in an amount or value of the chips accommodated in the chip float correlates with a change in an amount or value of the chips stored in the storage area.

8. The management system according to claim 1, wherein the storage area has a box shape.

9. The management system according to claim 1, further comprising a lock, wherein the lock is configured for preventing the chips from being taken out from the storage area.

10. The management system according to claim 1, wherein the storage area is configured to store the chips in a manner by which the chips can be independently placed in and removed from the storage area.

11. The management system according to claim 1, further comprising an opening and closing device, wherein the storage area can transition, by the opening and closing device, into an open state that enables the chips to be removed from the storage area.

12. The management system according to claim 1, wherein the controller is configured to compare a total amount of the chips determined to be present in the chip float based on a reading by the first antenna prior to a collection and/or redemption to a total amount of the chips determined to be present in the chip float based on a reading by the first antenna after the collection and/or redemption.

13. The management system according to claim 1, wherein, when the chips of the chip float are insufficient, the chip float can be replenished by the dealer with gaming chips transferred from the storage area into the chip float.

14. The management system according to claim 1, wherein:

the chip float is removably embedded in the game table;

chips bet by losing players of the game are collectible by the dealer and insertable by the dealer into the chip float; and chips in the chip float are payable by the dealer from the chip float to winning players of the game.

15. The management system according to claim 1, wherein the storage area is arranged under a dealer position of the game table on which the chip float is arranged.

16. The management system according to claim 1, wherein the controller is further configured to determine a total number of the chips in the chip float and the storage area combined, and determines whether an amount of the chips taken from the cage match an increased amount of the chips at the game table.

17. The management system according to claim 1, wherein the controller is further configured to determine a total value of the chips in the chip float and the storage area combined, and determines whether an amount of the chips taken from the cage match an increased value of the chips at the game table.

18. The management system according to claim 1, wherein the controller is further configured to record the chip IDs delivered to the game table in a database.

* * * * *